United States Patent
Kakimoto et al.

(10) Patent No.: US 7,660,218 B2
(45) Date of Patent: Feb. 9, 2010

(54) OPTICAL RECORDING METHOD, EVALUATION INDICATOR ACQUIRING METHOD, OPTICAL RECORDING APPARATUS, MICRO CPU DEVICE, AND COMPUTER PROGRAM

(75) Inventors: Hiroya Kakimoto, Gunma (JP); Fuyuki Miyazawa, Gunma (JP); Mitsuo Sekiguchi, Gunma (JP)

(73) Assignee: Taiyo Yuden Co., Ltd., Tokyo (JP)

( * ) Notice: Subject to any disclaimer, the term of this patent is extended or adjusted under 35 U.S.C. 154(b) by 526 days.

(21) Appl. No.: 11/501,432

(22) Filed: Aug. 8, 2006

(65) Prior Publication Data
US 2007/0041294 A1   Feb. 22, 2007

(30) Foreign Application Priority Data

Aug. 9, 2005   (JP)   ............................. 2005-230529
Aug. 9, 2005   (JP)   ............................. 2005-230541

(51) Int. Cl.
*G11B 19/02*   (2006.01)
(52) U.S. Cl. ..................... 369/47.53; 369/59.11; 369/94
(58) Field of Classification Search ................ 369/47.5, 369/47.51–47.53, 53.2, 53.22, 53.26, 53.27, 369/53.31, 59.11
See application file for complete search history.

(56) References Cited

U.S. PATENT DOCUMENTS 7,272,089 B2 * 9/2007 Matsumoto .............. 369/47.53
2003/0151994 A1 * 8/2003 Tasaka et al. ............ 369/47.53
2005/0265183 A1 * 12/2005 Kakimoto et al. ........ 369/47.53
2006/0067190 A1 * 3/2006 Kurobe et al. ............ 369/47.36
2006/0126462 A1 * 6/2006 Nakao et al. ............... 369/47.5

FOREIGN PATENT DOCUMENTS

| JP | 09-282664 | 10/1997 |
|----|-----------|---------|
| JP | 11-003550 | 1/1999 |
| JP | 2003-22532 | 1/2003 |
| JP | 2003-178448 | 6/2003 |
| JP | 2004-171740 | 6/2004 |
| JP | 2004-247024 | 9/2004 |
| JP | 2005-100610 | 4/2005 |
| JP | 2006-024246 | 1/2006 |
| JP | 2006-164443 | 6/2006 |
| WO | WO 02/29791 | 4/2002 |

* cited by examiner

*Primary Examiner*—Joseph H Feild
*Assistant Examiner*—Brian Butcher
(74) *Attorney, Agent, or Firm*—Law Office of Katsuhiro Arai

(57) ABSTRACT

In certain inventive aspects there are provided an optical recording method, an evaluation indicator acquiring method, an optical recording apparatus, and a CPU device, which can save a test time before recording information. An irradiation condition suitable for recording information on a first recording layer is extracted by recording and reproducing test information. The test information is recorded on and reproduced from a second recording layer. The irradiation condition suitable for recording information on the second recording layer is extracted on the basis of the test result for the first recording layer and the test result for the second recording layer. Accordingly, it is possible to save the test time for extracting the irradiation condition of the second recording layer.

36 Claims, 22 Drawing Sheets

Fig. 25

SINGLE-LAYERED MEDIUM STRATEGY TABLE

| MEDIUM TYPE \ RECORDING SPEED → | | | | | |
|---|---|---|---|---|---|
| ↓ | | | | | |
| | | | | | |
| | | | | | |
| | | | | | |

PRIOR ART

Fig. 26

MULTI-LAYERED STRATEGY TABLE

| MEDIUM TYPE \ RECORDING SPEED → | RECORDING LAYER | | | | | |
|---|---|---|---|---|---|---|
| ↓ | L0 | | | | | |
| | L1 | | | | | |
| | Ln | | | | | |
| | L0 | | | | | |
| | L1 | | | | | |
| | Ln | | | | | |
| | L0 | | | | | |
| | L1 | | | | | |
| | Ln | | | | | |

PRIOR ART

OPTICAL RECORDING METHOD, EVALUATION INDICATOR ACQUIRING METHOD, OPTICAL RECORDING APPARATUS, MICRO CPU DEVICE, AND COMPUTER PROGRAM

BACKGROUND OF THE INVENTION

1. Field of the Invention

The present invention relates to recording information on an optical recording medium having a plurality of recording layers, and more particularly, to an optical recording method which can save a test time at the time of recording information, an evaluation indicator acquiring method, an optical recording apparatus, a micro CPU device, and a computer program.

2. Description of the Related Technology

As known in the art, in an optical recording apparatus for recording data on an optical recording medium such as a known DVD by the use of a laser beam, when recording data on a predetermined recording medium, a recording condition suitable for the recording medium is generally obtained by performing a test recording operation to a test recording area in the recording medium before actually recording data on the recording medium.

However, with increasing requirement for increase in speed and capacity of the optical recording apparatus, when data are recorded on a multi-layered optical recording medium having a plurality of recording layers, it is necessary to obtain recording pulse conditions corresponding to the recording layers, respectively, due to differences in recording characteristics such as recording sensitivity, light reflectance, and thermal conductivity between the recording layers.

As a known technology for obtaining the recording pulse conditions, as shown in FIGS. 25 and 26, a method is generally used, in which a data table recording the recording pulse conditions for excellently recording data on the respective recording layers in accordance with conditions such as a recording speed every type of recording mediums is stored in advance in a memory of a recording drive (optical recording apparatus) and the recording pulse conditions corresponding to the types, the recording layers, and the recording speeds of the recording mediums are read out and set from the data table at the time of actually recording data on the recording mediums, thereby recording the data on the recording mediums.

In consideration of individual difference or non-uniformity of the recording drive or dependency of a laser on a temperature, a method of adjusting only a condition of the recording laser power in a test recording operation performed before the actual data recording operation is also generally used.

Patent Document 1: JP-A-2005-100610
Patent Document 2: JP-A-2003-22532
Patent Document 3: JP-A-2004-171740
Patent Document 4: JP-A-2004-247024
Patent Document 5: WO2002-029791
Patent Document 6: JP-A-2003-178448

However, in the known art, since the burden on the finite memory capacity of the recording drive is great and a high-capacity memory causes increase in cost of the recording drive, there is a first problem that the number of recording mediums to cope with is limited.

There is a second problem that it is not possible to satisfactorily cope with the non-uniformity in characteristics of the recording mediums and the recording drives, which cannot be compensated for by the use of only the recording laser power and it is not possible to satisfactorily cope with "unknown types of optical recording mediums" such as optical recording mediums not previously memorized in the recording drive and optical recording mediums come to the market after a recording drive comes to the market, which are partially coped with in the form of firm-up.

Accordingly, development of the technology has been required which makes it possible to acquire the optimum recording condition in a short time every recording speed depending upon characteristics of recording mediums and recording drives on which data should be recorded.

SUMMARY OF CERTAIN INVENTIVE ASPECTS

Certain inventive aspects are contrived to solve the above-mentioned problems. An object of some inventive aspects is to provide an optical recording method, an evaluation indicator acquiring method, an optical recording apparatus, a CPU device, and a computer program, which can save a test time before recording information so as to record information for a short time.

According to an inventive aspect, there is a provided an optical recording method in which when an optical recording apparatus records information on a recording medium having a plurality of layers including one recording layer and another recording layer by irradiating a laser beam to the recording medium, the optical recording apparatus extracts an irradiation condition of the laser beam by recording and reproducing test information with respect to a test area of the recording layers and records the information on the recording medium by irradiating the laser beam to the recording medium by the use of the extracted irradiation condition, wherein the optical recording apparatus performs: a reference recording layer testing step of recording and reproducing the test information with respect to the one recording layer with a change in type of a recording condition; a reference-recording-layer irradiation condition extracting step of extracting the irradiation condition suitable for recording information on the one recording layer on the basis of the test result of the reference recording layer testing step; an another recording layer testing step of recording and reproducing the test information with respect to the another recording layer in the number of times smaller than the number of times for changing the types of test recording conditions in the reference recording layer testing step; and an another-recording-layer irradiation condition extracting step of extracting the irradiation condition suitable for recording information on the another recording layer on the basis of the test result of the reference recording layer testing step and the test result of the another recording layer testing step.

According to an optical recording method, in the reference recording layer testing step, the test information is recorded on and reproduced from the one recording layer with a change in type of a recording condition and in the reference-recording-layer irradiation condition extracting step, the irradiation condition suitable for recording information on the one recording layer is extracted on the basis of the test result of the reference recording layer testing step.

In addition, in the another recording layer testing step, the test information is recorded on and reproduced from the another recording layer in the number of times smaller than the number of times for changing the types of test recording conditions in the reference recording layer testing step and in the another-recording-layer irradiation condition extracting step, the irradiation condition suitable for recording information is extracted on the another recording layer on the basis of the test result of the reference recording layer testing step and the test result of the another recording layer testing step.

Accordingly, information can be recorded on the another recording layer by the use of the extracted irradiation condition.

According to another inventive aspect, there is a provided an optical recording method in which when an optical recording apparatus records information on a recording medium having a plurality of layers including one recording layer and another recording layer by irradiating a laser beam to the recording medium, the optical recording apparatus extracts an irradiation condition of the laser beam by recording and reproducing test information with respect to a test area of the recording layers and records the information on the recording medium by irradiating the laser beam to the recording medium by the use of the extracted irradiation condition, wherein the optical recording apparatus performs: a reference recording layer testing step of recording and reproducing the test information with respect to the one recording layer with a change in type of a recording condition; a reference-recording-layer irradiation condition extracting step of extracting the irradiation condition suitable for recording information on the one recording layer on the basis of the test result of the reference recording layer testing step; an another recording layer testing step of recording and reproducing the test information with respect to the another recording layer by the use of any one type of test recording condition of the test recording conditions in the reference recording layer testing step; and an another-recording-layer irradiation condition extracting step of extracting the irradiation condition suitable for recording information on the another recording layer on the basis of the test result of the reference recording layer testing step and the test result of the another recording layer testing step.

According to one inventive aspect, in the reference recording layer testing step, the test information is recorded on and reproduced from the one recording layer with a change in type of a recording condition and in the reference-recording-layer irradiation condition extracting step, the irradiation condition suitable for recording information on the one recording layer is extracted on the basis of the test result of the reference recording layer testing step.

In addition, in the another recording layer testing step, the test information is recorded on and reproduced from the another recording layer by the use of any one type of test recording condition of the test recording conditions in the reference recording layer testing step and in the another-recording-layer irradiation condition extracting step, the irradiation condition suitable for recording information on the another recording layer is extracted on the basis of the test result of the reference recording layer testing step and the test result of the another recording layer testing step. Accordingly, information can be recorded on the another recording layer by the use of the extracted irradiation condition.

According to another inventive aspect, there is a provided an optical recording method in which when an optical recording apparatus records information on a recording medium having a plurality of layers including one recording layer and another recording layer by irradiating a laser beam to the recording medium, the optical recording apparatus extracts an irradiation condition of the laser beam by recording and reproducing test information with respect to a test area of the recording layers and records the information on the recording medium by irradiating the laser beam to the recording medium by the use of the extracted irradiation condition, wherein the optical recording apparatus performs: a reference recording layer testing step of recording and reproducing the test information with respect to the one recording layer by the use of the test recording condition accompanied with plural times of condition change; a reference-recording-layer irradiation condition extracting step of extracting the irradiation condition suitable for recording information on the one recording layer on the basis of the test result of the reference recording layer testing step; an another recording layer testing step of recording and reproducing the test information with respect to the another recording layer by the number of conditions smaller than the number of test recording conditions used in the reference recording layer testing step; and an another-recording-layer irradiation condition extracting step of extracting the irradiation condition suitable for recording information on the another recording layer on the basis of the test result of the reference recording layer testing step and the test result of the another recording layer testing step.

According to one inventive aspect, in the reference recording layer testing step, the test information is recorded on and reproduced from the one recording layer by the use of the test recording condition accompanied with plural times of condition change and in the reference-recording-layer irradiation condition extracting step, the irradiation condition suitable for recording information on the one recording layer is extracted on the basis of the test result of the reference recording layer testing step.

In addition, in the an another recording layer testing step, the test information is recorded on and reproduced from the another recording layer by the number of conditions smaller than the number of test recording conditions used in the reference recording layer testing step and in the another-recording-layer irradiation condition extracting step, the irradiation condition suitable for recording information is extracted on the another recording layer on the basis of the test result of the reference recording layer testing step and the test result of the another recording layer testing step. Accordingly, information can be recorded on the another recording layer by the use of the extracted irradiation condition.

According to another inventive aspect, there is a provided an optical recording method in which when an optical recording apparatus records information on a recording medium having a plurality of layers including one recording layer and another recording layer by irradiating a laser beam to the recording medium, the optical recording apparatus extracts an irradiation condition of the laser beam by recording and reproducing test information with respect to a test area of the recording layers and records the information on the recording medium by irradiating the laser beam to the recording medium by the use of the extracted irradiation condition, wherein the optical recording apparatus performs: a reference recording layer testing step of recording and reproducing the test information with respect to the one recording layer with plural types of test recording conditions; a reference-recording-layer irradiation condition extracting step of extracting the irradiation condition suitable for recording information on the one recording layer on the basis of the test result of the reference recording layer testing step; an another recording layer testing step of recording and reproducing the test information with respect to the another recording layer; and an another-recording-layer irradiation condition extracting step of extracting the irradiation condition suitable for recording information on the another recording layer on the basis of the test result of the reference recording layer testing step and the test result of the another recording layer testing step, wherein the reference recording layer testing step includes: a first test information recording step of recording the test information on the one recording layer; and a first test information reproducing step of reproducing the test information recorded in the first test information recording step, wherein the another recording layer testing step includes: a second test information recording step of recording the test information on the another recording layer; and a second test information reproducing step of reproducing the test information recorded in the second test information recording step, and wherein the number of times when the second test information recording step and the second test information reproducing step are switched is set smaller than the number of times when the first test information recording step and the first test information reproducing step are switched.

According to one inventive aspect, in the reference recording layer testing step, the first test information recording step of recording the test information with the plural kinds of test recording conditions and the first test information reproducing step of reproducing the test information recorded in the first test information recording step to the one recording layer by a predetermined number of times.

In addition, in the reference-recording-layer irradiation condition extracting step, the irradiation condition suitable for recording information on the one recording layer is extracted on the basis of the test result of the reference recording layer testing step.

In the another recording layer testing step, the second test information recording step of recording the test information on the another recording layer and the second test information reproducing step of reproducing the test information recorded in the second test information recording step are switched and performed by the number of times set smaller than the number of times of switching in the reference recording layer testing step.

In the another-recording-layer irradiation condition extracting step, the irradiation condition suitable for recording information on the another recording layer is extracted on the basis of the test result of the reference recording layer testing step and the test result of the another recording layer testing step. Accordingly, information can be recorded on the another recording layer by the use of the extracted irradiation condition.

According to another inventive aspect, there is a provided an optical recording method in which when an optical recording apparatus records information on a recording medium having a plurality of layers including one recording layer and another recording layer by irradiating a laser beam to the recording medium, the optical recording apparatus extracts an irradiation condition of the laser beam by recording and reproducing test information with respect to a test area of the recording layers and records the information on the recording medium by irradiating the laser beam to the recording medium by the use of the extracted irradiation condition, wherein the optical recording apparatus performs: a reference recording layer testing step of performing plural times a set of recording and reproducing the test information with respect to the one recording layer, the set including a gradual variation in recording condition; a reference-recording-layer irradiation condition extracting step of extracting the irradiation condition suitable for recording information on the one recording layer on the basis of the test result of the reference recording layer testing step; an another recording layer testing step of recording and reproducing the test information with respect to the another recording layer by the number of times smaller than the number of times when the set of recording and reproducing the test information is performed in the reference recording layer testing step; and an another-recording-layer irradiation condition extracting step of extracting the irradiation condition suitable for recording information on the another recording layer on the basis of the test result of the reference recording layer testing step and the test result of the another recording layer testing step.

According to one inventive aspect, in the reference recording layer testing step, a set of recording and reproducing the test information is performed plural times with respect to the one recording layer, wherein the set including a gradual variation in recording condition, and in the reference-recording-layer irradiation condition extracting step, the irradiation condition suitable for recording information on the one recording layer is extracted on the basis of the test result of the reference recording layer testing step.

In addition, in the another recording layer testing step, the test information recorded on and reproduced from the another recording layer by the number of times smaller than the number of times when the set of recording and reproducing the test information is performed in the reference recording layer testing step and in the another-recording-layer irradiation condition extracting step, the irradiation condition suitable for recording information on the another recording layer is extracted on the basis of the test result of the reference recording layer testing step and the test result of the another recording layer testing step. Accordingly, information can be recorded on the another recording layer by the use of the extracted irradiation condition.

According to another inventive aspect, there is provided an evaluation indicator acquiring method in an optical recording method in which when an optical recording apparatus records information on a recording medium having a plurality of layers including one recording layer and another recording layer by irradiating a laser beam to the recording medium, the optical recording apparatus acquires an evaluation indicator for determining an irradiation condition of the laser beam by recording test information in a test area of the recording layers and then reproducing the recorded test information and adjusts the irradiation condition of the laser beam by the use of the acquired evaluation indicator, wherein the optical recording apparatus performs: a test information recording step of recording the test information on the one recording layer with a gradual variation in recording condition of a laser power; an acquisition step of acquiring a variation of a pulse-width-adjusting evaluation indicator including at least one of a phase deviation, a length deviation, and an amplitude deviation of a pulse with the variation in recording condition of the laser power when reproducing the test information recorded in the test information recording step; a step of acquiring a correlation of the acquired variation of the pulse-width-adjusting evaluation indicator with the variation of the laser power; a second test information recording step of recording the test information on the another recording layer with the gradual variation in recording condition of the laser power; a calculation step of calculating a relation of the variation of the pulse-width-adjusting evaluation indicator with the variation of the pulse width in the another recording layer by applying the result of the second test recording step to the correlation; and a step of acquiring a pulse-width-adjusting evaluation indicator for determining the pulse width condition in the another recording layer by the use of the relation calculated in the calculation step.

According to an evaluation indicator acquiring method, the correlation between the variation in laser power and the variation in pulse-width-adjusting evaluation indicator in the one recording layer and the relation between the variation in laser power and the variation in the pulse-width-adjusting evaluation indicator in the another recording layer are acquired. Accordingly, the pulse-width-adjusting evaluation indicator for determining the pulse width condition in the another recording layer is acquired using the relation.

According to another inventive aspect, there is provided an evaluation indicator acquiring method in an optical recording method in which when an optical recording apparatus records information on a recording medium having a plurality of layers including one recording layer and another recording layer by irradiating a laser beam to the recording medium, the optical recording apparatus acquires an evaluation indicator for determining an irradiation condition of the laser beam by recording test information in a test area of the recording layers and then reproducing the recorded test information and adjusts the irradiation condition of the laser beam by the use of the acquired evaluation indicator, wherein the optical recording apparatus performs: a test information recording step of recording the test information on the one recording layer with a gradual variation in recording condition of a pulse width; an acquisition step of acquiring a laser-power-adjusting evaluation indicator with the variation in recording condition of the pulse width when reproducing the test information recorded on the one recording layer in the test information recording step; a step of acquiring a correlation of the variation of the laser-power-adjusting evaluation indicator with the variation of the pulse width; a second test information recording step of recording the test information on the another recording layer with the gradual variation in recording condition of the pulse width; a calculation step of calculating a relation of the variation of the laser-power-adjusting evaluation indicator with the variation in recording condition of the pulse width in the another recording layer by applying the result of the second test recording step to the correlation; and a step of acquiring a laser-power-adjusting evaluation indicator for determining the laser power condition in the another recording layer by the use of the relation calculated in the calculation step.

According to an evaluation indicator acquiring method, when the test information is recorded on the one recording layer with a gradual variation in recording condition of a pulse width and then the test information recorded on the one recording layer is reproduced, the laser-power-adjusting evaluation indicator with respect to the variation in recording condition of the pulse width is acquired. In addition, the correlation between the variation of the laser-power-adjusting evaluation indicator and the variation of the pulse width is acquired. The test information is recorded on the another recording layer with the gradual variation in recording condition of the pulse width, and the laser-power-adjusting evaluation indicator with the variation in recording condition of the pulse width in the another recording layer is acquired by applying the result of the second test recording step to the correlation.

According to another inventive aspect, there is provided an evaluation indicator acquiring method in an optical recording method in which when an optical recording apparatus records information on a recording medium by irradiating a laser beam to the recording medium, the optical recording apparatus acquires an evaluation indicator for determining an irradiation condition of the laser beam by recording test information in a test area of the recording layers and then reproducing the recorded test information and adjusts the irradiation condition of the laser beam by the use of the acquired evaluation indicator, wherein the optical recording apparatus performs: an information recording step of recording test recording information and/or user data recording information on the recording layers; and a step of reproducing the information recorded in the information recording step and acquiring plural kinds of evaluation indicators of the irradiation conditions of the laser beam from the reproduced information.

According to an evaluation indicator acquiring method, information is recorded on the recording layer, the recorded information is reproduced, and the plural kinds of evaluation indicators of the irradiation condition of the laser beam are acquired from the reproduced information and the recording conditions.

According to another inventive aspect, there are also provided an optical recording apparatus having units for performing the process steps of the optical recording method, a CPU device used for the optical recording apparatus, and a computer program for executing the optical recording method by driving the CPU used for the optical recording apparatus.

According to an optical recording method, the test information is recorded on and reproduced from one recording layer with a change in type of a recording condition, the irradiation condition suitable for recording information on the one recording layer is extracted on the basis of the test result, the test information is recorded on and reproduced from another recording layer in the number of times smaller than the number of times for changing the types of test recording conditions in the reference recording layer testing step, the irradiation condition suitable for recording information on the another recording layer is extracted on the basis of the test result of the one recording layer and the test result of the another recording layer, and information is recorded on the another recording layer by the use of the extracted irradiation condition. Accordingly, it is possible to reduce the test time for extracting the irradiation condition of the another recording layer and thus to reduce the test time before recording information, thereby recording information for a short time. In addition, it is possible to reduce the recording area used for the test recording operation in comparison with that in the past.

According to an optical recording method, the test information is recorded on and reproduced from the one recording layer with a change in type of a recording condition, the irradiation condition suitable for recording information on the one recording layer is extracted on the basis of the test result, the test information is recorded on and reproduced from the another recording layer by the use of any one type of test recording condition of the test recording conditions in the reference recording layer testing step, the irradiation condition suitable for recording information on the another recording layer is extracted on the basis of the test result of the one recording layer and the test result of the another recording layer, and information is recorded on the another recording layer by the use of the extracted irradiation condition. Accordingly, it is possible to reduce the test time for extracting the irradiation condition of the another recording layer and thus to reduce the test time before recording information, thereby recording information for a short time. In addition, it is possible to reduce the recording area used for the test recording operation in comparison with that in the past.

According to an optical recording method, the test information is recorded on and reproduced from the one recording layer by the use of the test recording condition accompanied with plural times of condition change, the irradiation condition suitable for recording information on the one recording layer is extracted on the basis of the test result, the test information is recorded on and reproduced from the another recording layer by the number of conditions smaller than the number of test recording conditions used in the reference recording layer testing step, the irradiation condition suitable for recording information on the another recording layer is extracted on the basis of the test result of the reference recording layer testing step and the test result of the another recording layer testing step, and information is recorded on the another recording layer by the use of the extracted irradiation condition. Accordingly, it is possible to reduce the test time for extracting the irradiation condition of the another recording layer and thus to reduce the test time before recording information, thereby recording information for a short time. In addition, it is possible to reduce the recording area used for the test recording operation in comparison with that in the past.

According to an optical recording method, the recording and reproducing of the test information are switched and performed by a predetermined number of times when the test information is recorded on and reproduced from the one recording layer with plural types of test recording conditions, the irradiation condition suitable for recording information on the one recording layer is extracted on the basis of the test result, the recording and reproducing of the test information is performed by the number of times smaller than the number of times for switching the recording and reproducing of the test information in the one recording layer when the recording and reproducing of the test information are performed to the another recording layer, the irradiation condition suitable for recording information on the another recording layer is extracted on the basis of the test result of the one recording layer and the test result of the another recording layer, and information is recorded on the another recording layer by the use of the extracted irradiation condition. Accordingly, it is possible to reduce the test time for extracting the irradiation condition of the another recording layer and thus to reduce the test time before recording information, thereby recording information for a short time. In addition, it is possible to reduce the recording area used for the test recording operation in comparison with that in the past.

According to an optical recording method, a set of recording and reproducing the test information is performed plural times to the one recording layer, wherein the set includes a gradual variation in recording condition, the irradiation condition suitable for recording information on the one recording layer is extracted on the basis of the test result, the test information is recorded on and reproduced from the another recording layer by the number of times smaller than the number of times when the set of recording and reproducing the test information is performed in the test of the one recording layer, the irradiation condition suitable for recording information on the another recording layer is extracted on the basis of the test result of the one recording layer and the test result of the another recording layer, and information is recorded on the another recording layer by the use of the extracted irradiation condition. Accordingly, it is possible to reduce the test time for extracting the irradiation condition of the another recording layer and thus to reduce the test time before recording information, thereby recording information for a short time. In addition, it is possible to reduce the recording area used for the test recording operation in comparison with that in the past.

According to an evaluation indicator acquiring method, the correlation between the variation in laser power and the variation in pulse-width-adjusting evaluation indicator in the one recording layer and the relation between the variation in laser power and the variation in the pulse-width-adjusting evaluation indicator in the another recording layer are acquired, and the pulse-width-adjusting evaluation indicator for determining the pulse width condition in the another recording layer is acquired using the relation. Since the pulse-width-adjusting evaluation indicator of the another recording layer is calculated, it is not necessary to actually perform the test recording operation for acquiring the pulse-width-adjusting evaluation indicator. Accordingly, it is possible to reduce the test time for extracting the irradiation condition of the another recording layer and thus to reduce the test time before recording information, thereby recording information for a short time. In addition, it is possible to reduce the recording area used for the test recording operation in comparison with that in the past.

According to an evaluation indicator acquiring method, since the recording result of the test process performed to the another recording layer with the gradual variation in recording condition of the pulse width is applied to the correlation between the variation of pulse width and the variation of the laser-power-adjusting evaluation indicator in the one recording layer and thus the laser-power-adjusting evaluation indicator with the variation in recording condition of the pulse width in the another recording layer is acquired, it is not necessary to record the test information for each kind of the evaluation indicators. Accordingly, it is possible to reduce the test time and thus to reduce the test time before recording information, thereby recording information for a short time. In addition, it is possible to reduce the recording area used for the test recording operation in comparison with that in the past.

According to an evaluation indicator acquiring method, since the test information is recorded on the recording layer with the gradual variation in recording conditions, the recorded information is reproduced, and the plural kinds of evaluation indicators of the irradiation condition of the laser beam are acquired from the reproduced information and the recording conditions, it is not necessary to record the test information for each kind of the evaluation indicators. Accordingly, it is possible to reduce the test time and thus to reduce the test time before recording information, thereby recording information for a short time. In addition, it is possible to reduce the recording area used for the test recording operation in comparison with that in the past.

According to an optical recording apparatus, it is possible to easily embody the optical recording method.

According to the micro CPU device, it is possible to easily embody the optical recording method.

According to the computer program, it is possible to easily embody the optical recording method by the use of a CPU.

BRIEF DESCRIPTION OF THE DRAWINGS

FIG. 25 is a diagram illustrating a known strategy table.

FIG. 26 is a diagram illustrating a known strategy table.

DESCRIPTION OF PREFERRED EMBODIMENTS

Hereinafter, certain embodiments will be described with reference to the drawings.

Figure 1:
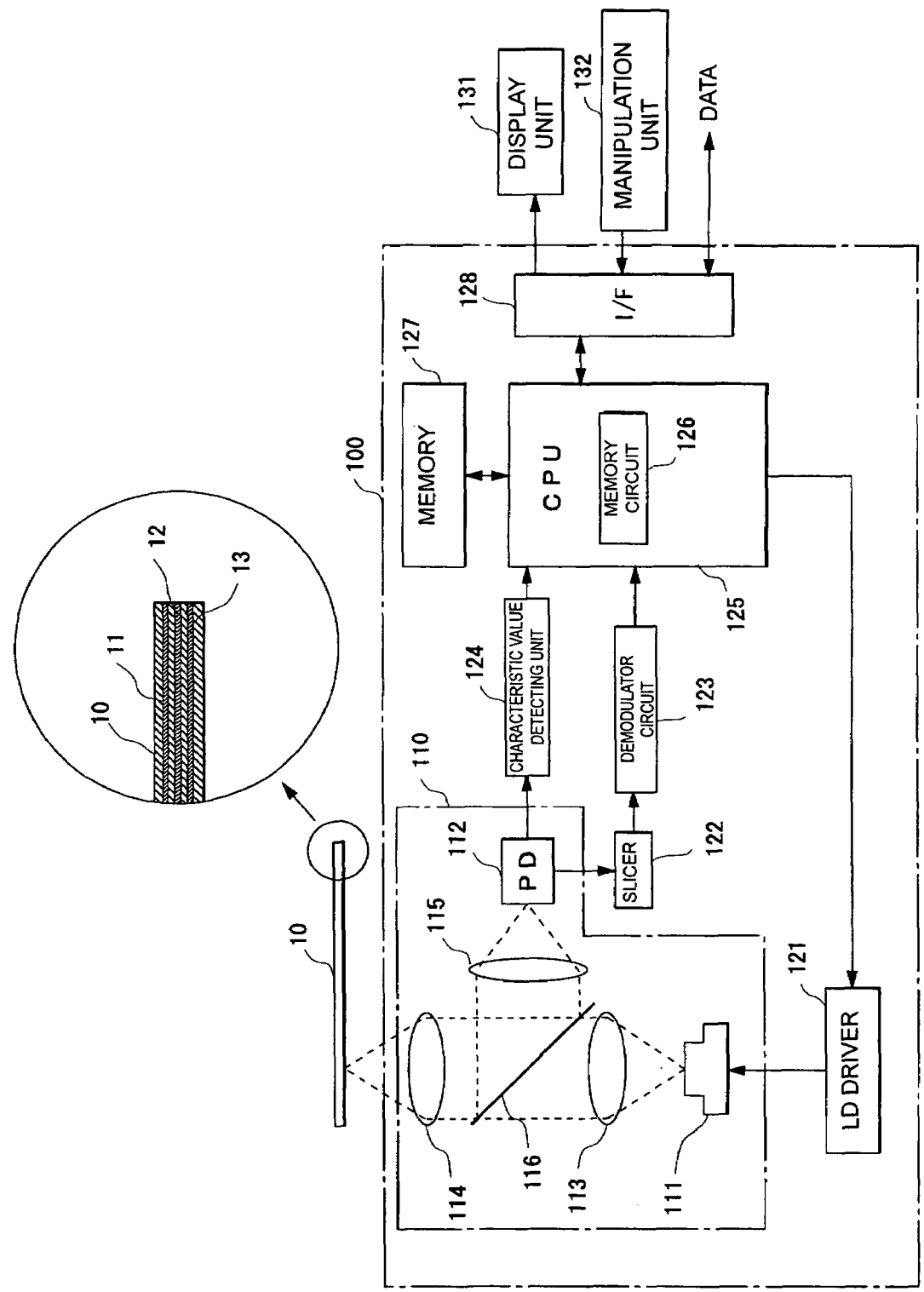
FIG. 1 is a diagram illustrating a configuration of an optical recording apparatus and a configuration of an optical disk according to a first embodiment.

FIG. 1 is a diagram illustrating a configuration of an optical recording apparatus and a configuration of an optical disk according to a first embodiment. In the figure, reference numeral 10 denotes an optical disk, which is a multi-layered optical recording medium such as known DVD, HD-DVD, and blue-ray disk and is an optical recording medium having three recording layers of a first recording layer 11, a second recording layer 12, and a third recording layer 13 from the position most away from a layer beam irradiating surface in the first embodiment. In the first embodiment, the optical recording medium having three recording layers is illustrated, but an optical recording apparatus 100 may record and reproduce information using an optical recording medium having two or more recording layers as the optical disk 10.

Reference numeral 100 denotes an optical recording apparatus, which includes an optical pickup 110, a laser diode (hereinafter, referred to as LD) driver 121, a slicer 122, a demodulator circuit 123, a characteristic value detecting unit 124, a CPU device (hereinafter, referred to as CPU) 125, a memory unit 127, and an interface (hereinafter, referred to as I/F) 128. Here, only a configuration specific to some embodiments is described.

A display unit 131 such as a personal computer or a display and a manipulation unit 132 such as a keyboard are connected to the optical recording apparatus 100.

The optical pickup 110 includes a laser diode (hereinafter, referred to as LD) 111, a photo detector (hereinafter, referred to as PD) 112, a collimator lens 113, an objective lens 114, a detector lens 115, and a beam splitter 116. A laser beam emitted from the LD 111 is irradiated to the optical disk 10 through the collimator lens 113, the beam splitter 116, and the objective lens 114.

The laser beam reflected by the optical disk 10 passes through the objective lens 114, is reflected by the beam splitter 116, and then is incident on the PD 112 through the detector lens 115. The PD 112 outputs current corresponding to the intensity of the incident beam.

The LD driver 121 supplies driving current to the LD 111 on the basis of a recording signal input from the CPU 125, thereby allowing the LD 111 to emit a laser beam.

The slicer 122 slices a current signal output from the PD 112 by the use of a predetermined threshold value, converts the current into a binary voltage signal, and then outputs the binary voltage signal.

The demodulator circuit 123 is a circuit for demodulating the encoded binary signal output from the slicer 122 and outputting the demodulated binary signal to the CPU 125 and serves to output a digital signal, which is obtained by demodulating a signal EFM-modulated and encoded with pulse widths of binary voltage signals 3T to 11T output from the slicer 122, to the CPU 125.

The characteristic value detecting unit 124 receives the current signal output from the PD 112, detects a physical characteristic value from the reflected beam from the optical disk 10 on the basis of the current value, and outputs the physical characteristic value as digital information to the CPU 125. The physical characteristic value detected from the reflected beam is a physical characteristic value which depends upon, for example, the recording laser power or the recording pulse condition and is suitable for optimizing the recording pulse condition. In the first embodiment, the physical characteristic value includes β, asymmetry, phase, amplitude, and the like.

The CPU 125 is a well-known CPU device and includes a memory circuit 126 storing a computer program for operating the CPU therein. The CPU 125 may or may not be a one-chip CPU. The CPU 125 controls a driving mechanism unit (not shown) to adjust the position, the tracking, and the focus of the optical pickup 110 and to control the rotation of the optical disk 10, records (writes) externally input data on the optical disk 10 or reads out data recorded on the optical disk 10 on the basis of a data table stored in the memory unit 127, and outputs the read data to an external device. In addition, the CPU 125 performs a test process at the time of recording data on the optical disk 10 through the processes to be described later and obtains the optimum laser beam condition, thereby allowing data to be recorded on the optical disk.

The memory unit 127 is connected to the CPU 125 and stores data corresponding to plural types of optical disks in a data table as a known strategy table.

The I/F 128 is an interface for connecting the CPU to the external display unit 131 and the manipulation unit 132 and serves to transmit recording and reproducing data between an external device and the CPU 125.

In the above-mentioned configuration, information is recorded on and reproduced from the optical disk 10 by the use of a laser beam output from the LD 111, thereby transmitting and receiving data to and from an external apparatus such as a personal computer (PC). The optical recording apparatus 100 records information in the order of the first recording layer 11, the second recording layer 12, and the third recording layer 13 when recording data on the optical disk 10.

When recording data on the optical disk 10, a strategy as a recording condition of the optical disk 10 is determined by encoding the recording data and processing the encoded recording data by the use of the CPU 125, the strategy is converted into a recording pulse by the use of the LD driver 121, and a laser beam, which is converted into a pulse on the basis of the recording pulse, is emitted from the LD 111.

The LD driver 121 drives the LD 111 on the basis of the input recording pulse, and the LD 111 controls the output laser beam on the basis of the recording pulse and irradiates the controlled laser beam to the optical disk 10, which rotates at a constant linear speed or at a constant angular speed, through the collimator lens 113, the beam splitter 116, and the objective lens 114. Consequently, a recording pattern having pits and space lines corresponding to desired recording data is recorded on the optical disk 10.

In order to record data on the optical disk 10, test information is first recorded in and reproduced from a test area of the optical disk 10 as known well, thereby determining the optimum condition for irradiating a laser beam. In the optical recording apparatus 100 according to the first embodiment, it is possible to further reduce the test time for determining the optimum condition for irradiating a laser beam in comparison with that in the past.

Hereinafter, a method of determining the laser beam irradiating condition according to the first embodiment will be described in detail.

Figure 2:
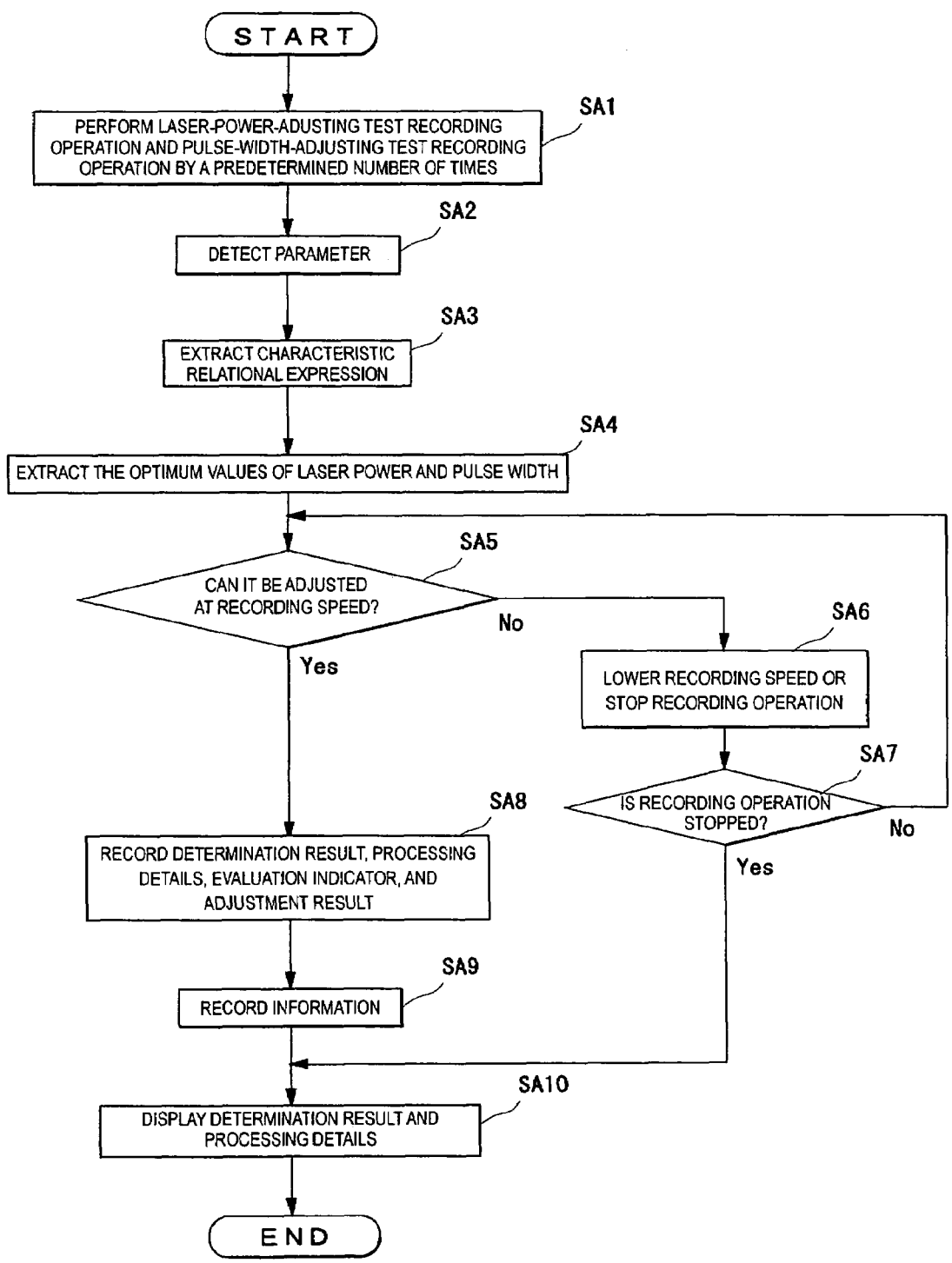
FIG. 2 is a flowchart illustrating a recording operation to a first recording layer according to the first embodiment.
Figure 3:
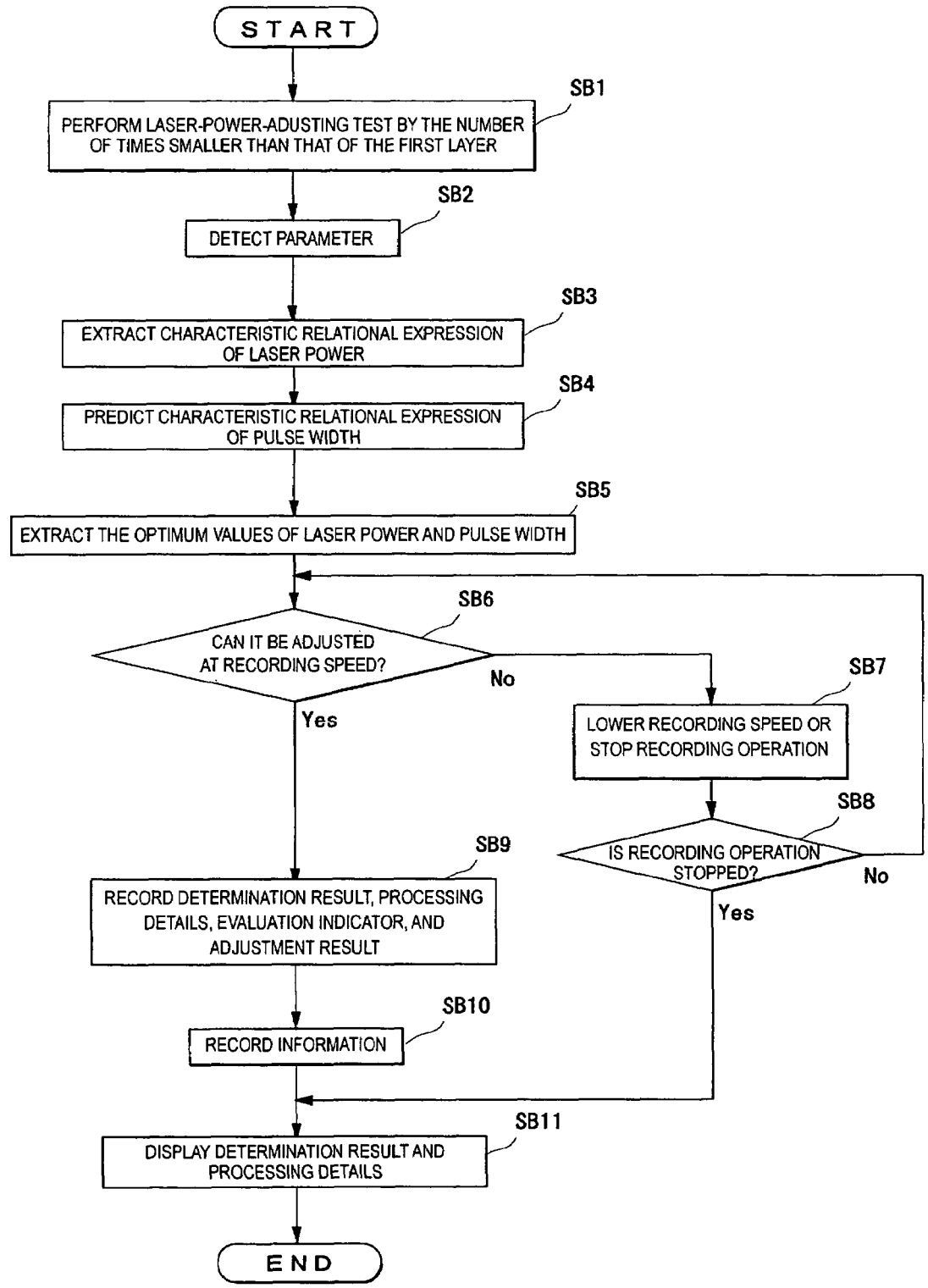
FIG. 3 is a flowchart illustrating a recording operation to a recording layer other than the first recording layer according to the first embodiment.

FIGS. 2 and 3 are flowcharts illustrating a recording operation to a recording layer according to the first embodiment. A computer program for performing the process is stored in advance in the memory circuit 126 of the CPU 125 and the process is performed by the CPU 125. In the first embodiment, the test process at the time of recording data on the first recording layer 11 of the optical disk 10 is almost the same as that of the past, but the test process at the time of recording data on a recording layer other than the first recording layer 11 is different from the test process for the first recording layer 11 so as to reduce the test time.

Figure 4:
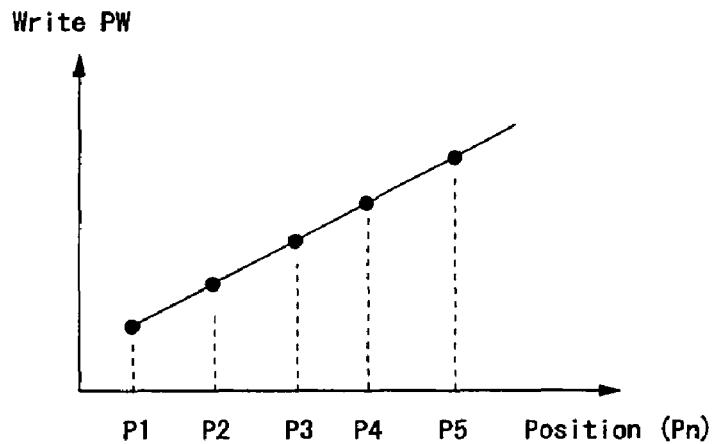
FIG. 4 is a diagram illustrating a gradual variation in laser power in a laser-power-adjusting test recording operation.

That is, when recording data on the first recording layer 11, the process shown in FIG. 2 is performed. In the initial process, by performing a test process using two types of test recording conditions including a predetermined number of times of a laser-power-adjusting test recording operation and a predetermined number of times of a pulse-width-adjusting test recording operation by the use of the same optimum power control (hereinafter, referred to as OPC) of a recording laser beam as that in the past, the recorded data are reproduced (SA1) and parameters (evaluation indicators) of the laser beam irradiating conditions are detected (SA2). In case of DVD, examples of the parameters can include β (asymmetry), a laser beam irradiating power, and a pulse phase. The laser-power-adjusting test recording operation is performed while gradually varying the laser power Write PW, as shown in FIG. 4, and similarly, the pulse-width-adjusting test recording operation is performed while gradually varying the pulse width. When the data of the strategy table stored in the memory unit 127 can be used at the time of detecting the parameters, the data are used, and when the optical disk 10 is an unknown type of optical disk for which the data of the strategy table stored in the memory 127 cannot be used, a well-known automatic strategy detecting process is performed.

Figure 5:
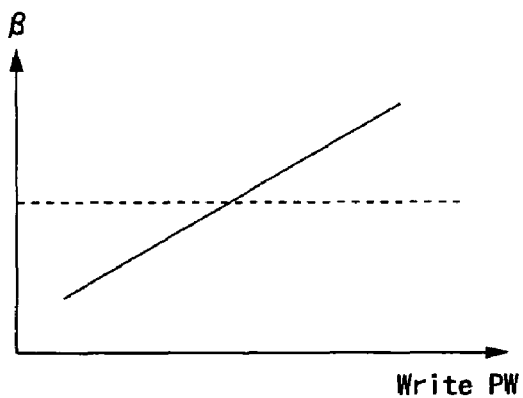
FIG. 5 is a diagram illustrating a characteristic relational expression expressing a relation between laser power and β.
Figure 6:
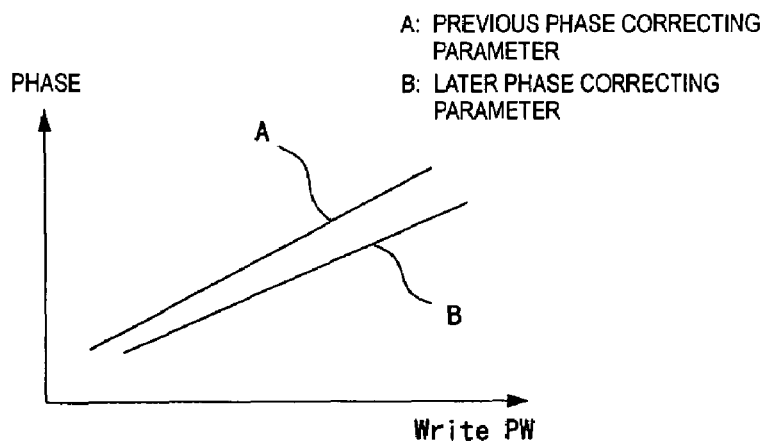
FIG. 6 is a diagram illustrating a characteristic relational expression indicating a pulse phase correcting parameter in a relation between laser power and pulse phase.
Figure 7:
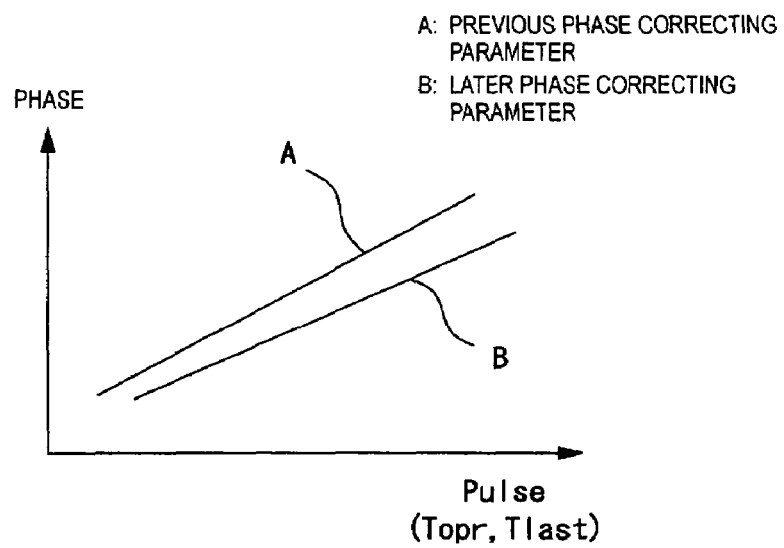
FIG. 7 is a diagram illustrating a characteristic relational expression indicating a pulse phase correcting parameter in a relation between positional shift of the rising and falling edges of a pulse and pulse phase.

Subsequently, a characteristic relational expression is derived from the detected parameters (SA3). Examples of the characteristic relational expression can include a characteristic relational expression indicating a relation between the laser power Write PW and β, which is shown in the graph of FIG. 5, a characteristic relational expression indicating a phase correcting parameter in a relation between the laser power write PW and the pulse phase, which is shown in the graph of FIG. 6, and a characteristic relational expression indicating a pulse phase correcting parameter in a relation between positional shift Pulse (Topr, Tlast) of the rising and falling edges of a pulse and pulse phase, which is shown in the graph of FIG. 7. Here, two kinds of parameters (evaluation parameters), that is, the characteristic relational expression indicating the relation between the laser power Write PW and β, which is shown in the graph of FIG. 5, and the characteristic relational expression indicating the phase correcting parameter in a relation between the laser power Write PW and the pulse phase, which is shown in the graph of FIG. 6, are extracted from the test information recorded with the gradual variation of the laser power.

Thereafter, the optimum values of the laser power and the pulse width are extracted using the parameters obtained from the extracted characteristic relational expressions (SA4). Then, it is determined whether the optimum values can be applied to recording data with predetermined quality after the optimum values are adjusted at a desired recording speed (SA5). In the adjustment, at least one of the laser power and the pulse width of the laser beam to be irradiated to the recording layer is adjusted so that a laser-power-adjusting parameter (evaluation indicator) and a pulse-width-adjusting parameter (evaluation indicator) become predetermined values suitable for recording data with predetermined quality with respect to gradual variations in the recording conditions of laser power and pulse width. The OPC may be performed in the adjustment.

When it is determined in SA5 that the optimum values can be applied, the process of SA8 to be described later is performed. When it is determined that the optimum values cannot be applied, a predetermined recording speed obtained by lowering the recording speed is set or the recording operation is stopped (SA6) and then it is determined whether the recording operation is stopped (SA7). When it is determined that the recording operation is stopped, the process of SA10 to be described later is performed and when the lowered recording speed is set, the process of SA5 is performed.

When it is determined in SA5 that the optimum values can be applied to the desired recording speed, the determination result, the processing details, and information on the parameters (evaluation indicators) and the adjustment result are recorded on the optical disk 10 and are recorded in the memory unit 127 to have a correlation with a medium ID of the optical disk 10 (SA8). In this way, by leaving the information as a record, the information can be utilized to record data on the same type of optical disk 10. Condition data used for the test recording operation may be recorded to correspond to the information. The information may be recorded in only any one of the optical disk 10 and the memory unit 127. Information on only any one of the determination result and the processing details accompanied with the determination may be recorded, or information on only any one of the parameters (evaluation indicators) and the adjustment result using the parameters may be recorded.

Then, data are recorded on the optical disk 10 by the use of the optimum values (SA9). Subsequently, the determination result and the processing details are displayed on the display unit 131 (SA10) and then the data recording operation to the first recording layer 11 is ended. Only any one of the determination result and the processing details accompanied with the determination may be displayed on the display unit 131.

When data are recorded on the recording layers 12 and 13 other than the first recording layer 11, the process shown in FIG. 3 is performed.

That is, when data are recorded on the recording layers 12 and 13 other than the first recording layer 11, the process shown in FIG. 3 is performed. In the process, a test process using one kind of test recording condition of only the laser-power-adjusting test recording operation is performed by the use of the same OPC as that in the past by the number of times smaller than the number of times for the first recording layer 11, thereby reproducing the recorded data (SB1) and detecting the parameters (evaluation indicators) under the laser beam irradiating condition (SB2). The laser-power-adjusting test recording operation is performed while gradually varying the laser power Write PW as shown in FIG. 4.

Figure 8:
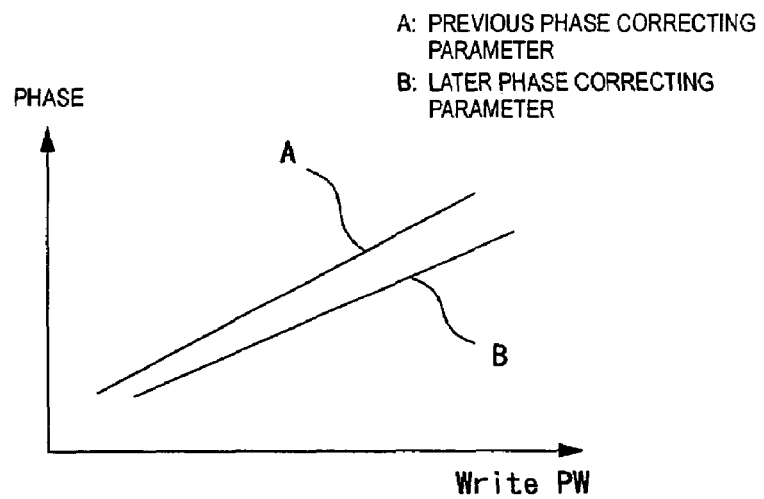
FIG. 8 is a diagram illustrating a characteristic relational expression indicating a phase correcting parameter in a relation between laser power and pulse phase.

Subsequently, a characteristic relational expression is derived from the detected parameters (SB3). For example, the characteristic relational expression indicating a phase correcting parameter in a relation between the laser power write PW and the pulse phase is derived which is shown in the graph of FIG. 8.

Figure 9:
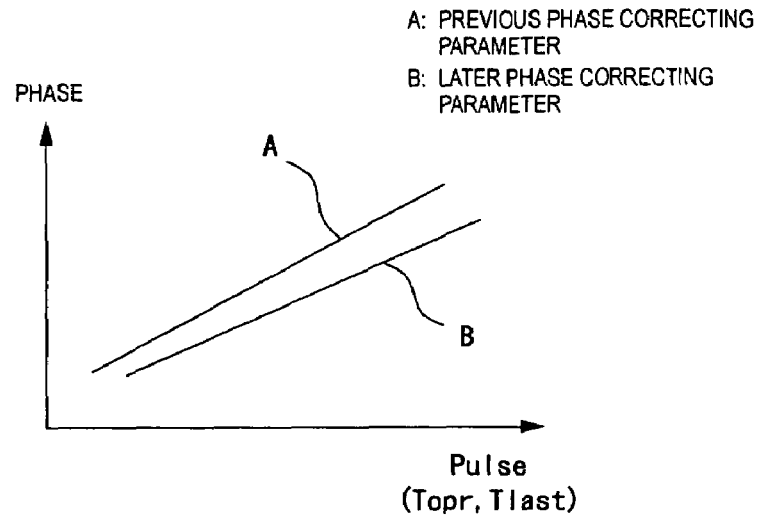
FIG. 9 is a diagram illustrating a characteristic relational expression indicating a pulse phase correcting parameter in a relation between positional shift of the rising and falling edges of a pulse and pulse phase.

Thereafter, by using the derived characteristic relational expression and the characteristic relational expressions extracted for the first recording layer 11, a characteristic relational expression indicating the pulse phase correcting parameter in a relation between the positional shift of a pulse and the pulse phase in other recording layers 12 and 13, that is, the pulse phase correcting parameter in a relation between the positional shift Pulse (Topr, Tlast) of the rising and falling edges of a pulse and the pulse phase, which is shown in the graph of FIG. 9, is predicted (SB4).

Subsequently, the optimum values of the laser power and the pulse width are extracted using the extracted characteristic relational expressions (SB5). Then, it is determined whether the optimum values can be applied to recording data with predetermined quality after the optimum values are adjusted at a desired recording speed (SB6). In the adjustment, at least one of the laser power and the pulse width of the laser beam to be irradiated to the recording layer is adjusted so that a laser-power-adjusting parameter (evaluation indicator) and a pulse-width-adjusting parameter (evaluation indicator) become predetermined values suitable for recording data with predetermined quality with respect to gradual variations in the recording conditions of laser power and pulse width. The OPC may be performed in the adjustment.

When it is determined in SB6 that the optimum values can be applied, the process of SB9 to be described later is performed. When it is determined that the optimum values cannot be applied, a predetermined recording speed obtained by lowering the recording speed is set or the recording operation is stopped (SB7) and then it is determined whether the recording operation is stopped (SB8). When it is determined that the recording operation is stopped, the process of SB11 to be described later is performed and when the lowered recording speed is set, the process of SB6 is performed. When the optimum values cannot be applied even by lowering the recording speed, the process of SB1 and the processes subsequent thereto may be performed again instead of stopping the recording operation.

When it is determined in SB6 that the optimum values can be applied to the desired recording speed, the determination result, the processing details, and information on the parameters (evaluation indicators) and the adjustment result are recorded on the optical disk 10 and are recorded in the memory unit 127 to have a correlation with a medium ID of the optical disk 10 (SB9).

Then, data are recorded on the optical disk 10 by the use of the optimum values (SB10). Subsequently, the determination result and the processing details are displayed on the display unit 131 (SB12) and then the data recording operation to the second or third recording layer 12 or 13 is ended.

According to the first embodiment, the test information is recorded on and reproduced from the first recording layer 11 with a change in type of a recording condition, the irradiation condition suitable for recording information on the first recording layer 11 is extracted on the basis of the obtained test result, the test information is recorded on and reproduced from the second and third recording layers 12 and 13 in the number of times smaller than the number of times for changing the types of test recording conditions for the first recording layer, the irradiation condition suitable for recording information on the second or third recording layer 12 or 13 is extracted on the basis of the test result of the first recording layer 11 and the test result of the second or third recording layer 12 or 13, and information is recorded on the second or third recording layer 12 or 13 by the use of the extracted irradiation condition. Accordingly, it is possible to reduce the test time for extracting the irradiation condition of the second and third recording layers 12 and 13 and thus to reduce the test time before recording information, thereby recording information for a short time.

In the test recording operation of the second or third recoding layer 12 or 13, since only the test process with a change in laser power is performed but the test process with a change in pulse width which requires much time and a large test area is not performed, it is possible to further reduce the test time.

As described above, in the general test recording operation, the characteristic relation between the laser power and β is obtained by the laser-power-adjusting test process, the optimum laser power is extracted from the characteristic relation, the characteristic relation between the pulse and the phase shift is obtained by the pulse-width-adjusting test process, and the optimum pulse width, that is, a strategy, is extracted from the characteristic relation. However, in the first embodiment, by performing only the laser-power-adjusting test process to the recording layers other than the first recording layer 11, the number of test recording conditions is decreased to reduce the test time, and then it is possible to extract the strategy having the optimum laser power and the optimum pulse width.

According to the optical recording apparatus 100 of the first embodiment, it is possible to easily embody the optical recording method. In addition, according to the micro CPU device 125 of the first embodiment, it is possible to easily embody the optical recording method. In addition, according to the computer program of the first embodiment, it is possible to easily embody the optical recording apparatus 100 and the optical recording method by the use of any CPU.

Figure 10:
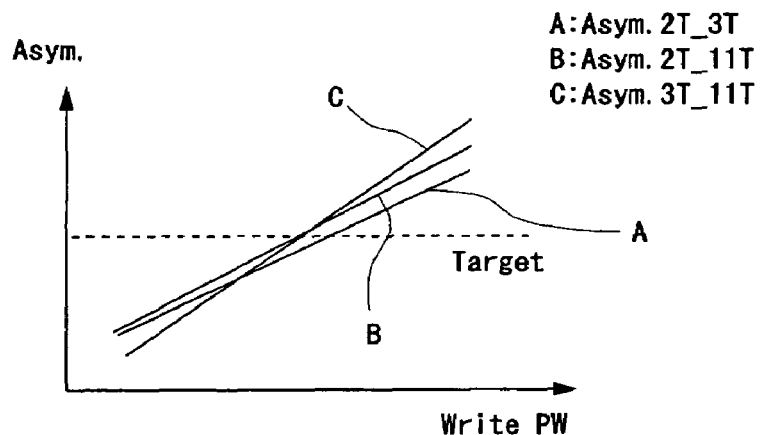
FIG. 10 is a diagram illustrating a characteristic relational expression indicating a relation between laser power and asymmetry.
Figure 11:
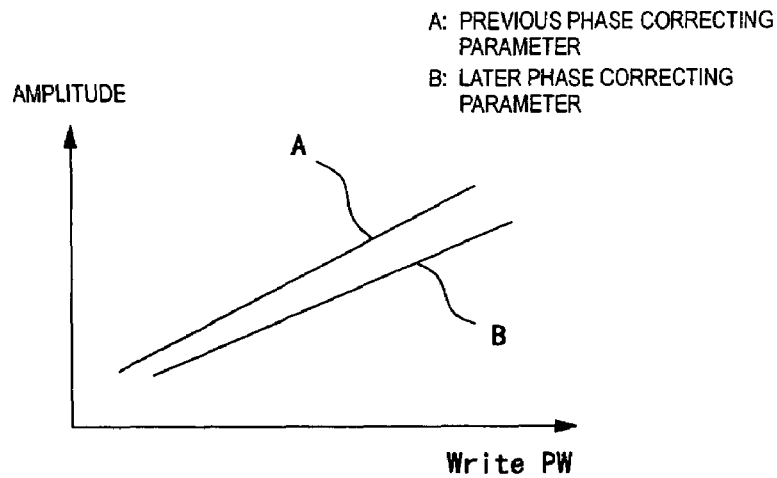
FIG. 11 is a diagram illustrating a characteristic relational expression indicating a phase correcting parameter in a relation between laser power and amplitude.
Figure 12:
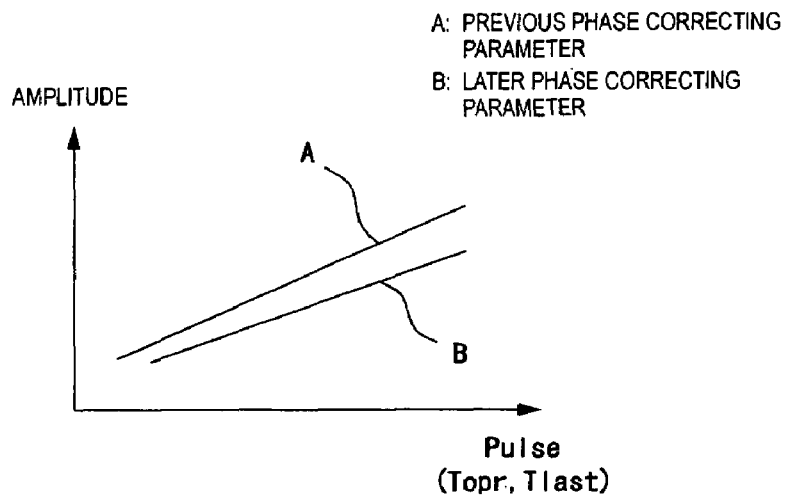
FIG. 12 is a diagram illustrating a characteristic relational expression indicating a pulse phase correcting parameter in a relation between positional shift of the rising and falling edges of a pulse and pulse phase.
Figure 13:
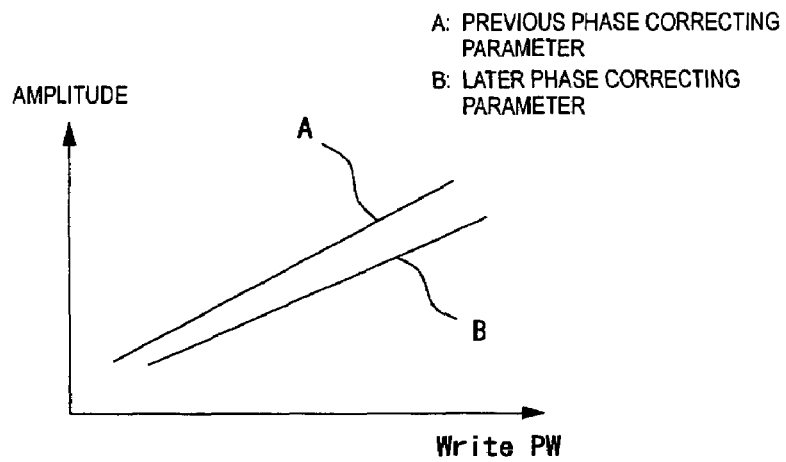
FIG. 13 is a diagram illustrating a characteristic relational expression indicating a phase correcting parameter in a relation between laser power and amplitude.
Figure 14:
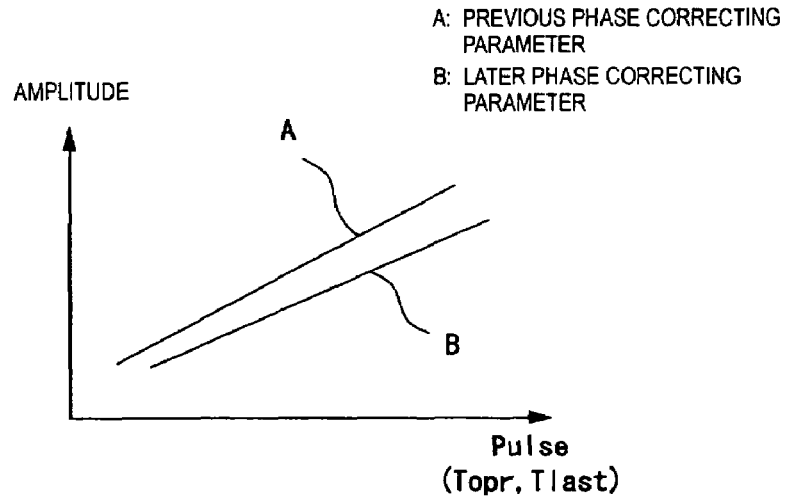
FIG. 14 is a diagram illustrating a characteristic relational expression indicating a pulse phase correcting parameter in a relation between positional shift of the rising and falling edges of a pulse and pulse phase.

In the above-mentioned embodiment, a well-known multi-layered DVD has been used as the optical disk 10. However, even when an HD-DVD is used as the optical disk 10, the same advantages can be obtained by the same processes. When a well-known blue-ray disk is used as the optical disk 10, the blue-ray disk has a specification different from that of the DVD. Accordingly, in this case, by extracting for the first recording layer a characteristic relational expression indicating a relation between the laser power Write PW and asymmetry, which is shown in the graph of FIG. 10, a characteristic relational expression indicating a phase correcting parameter in a relation between the laser power write PW and the amplitude, which is shown in the graph of FIG. 11, and a characteristic relational expression indicating a phase correcting parameter in a relation between positional shift Pulse (Topr, Tlast) of the rising and falling edges of a pulse and the amplitude, which is shown in the graph of FIG. 12, for the first recording layer, acquiring a characteristic relational expression indicating the phase correcting parameter in a relation between the laser power Write PW and the amplitude, which is shown in the graph of FIG. 13, for the recording layer other than the first recording layer through a test, and predicting a characteristic relational expression indicating the phase correcting parameter in a relation between the positional shift Pulse (Topr, Tlast) of the rising and falling edges of a pulse and the amplitude which is shown in the graph of FIG. 14, the optimum values of the other recording layer can be obtained. The pulse-width-adjusting parameter (evaluation indicator) means a phase deviation, a length deviation, and an amplitude deviation.

Next, a second embodiment will be described.

The apparatus configuration of the second embodiment is basically similar to that of the first embodiment, but is different from that of the first embodiment, in that a CPU 125 storing a computer program including a different recording operation to the recording layers 12 and 13 other than the first recording layer 11 is used in the second embodiment. In the following description, the same elements as the first embodiment are denoted by the same reference numerals.

Figure 15:
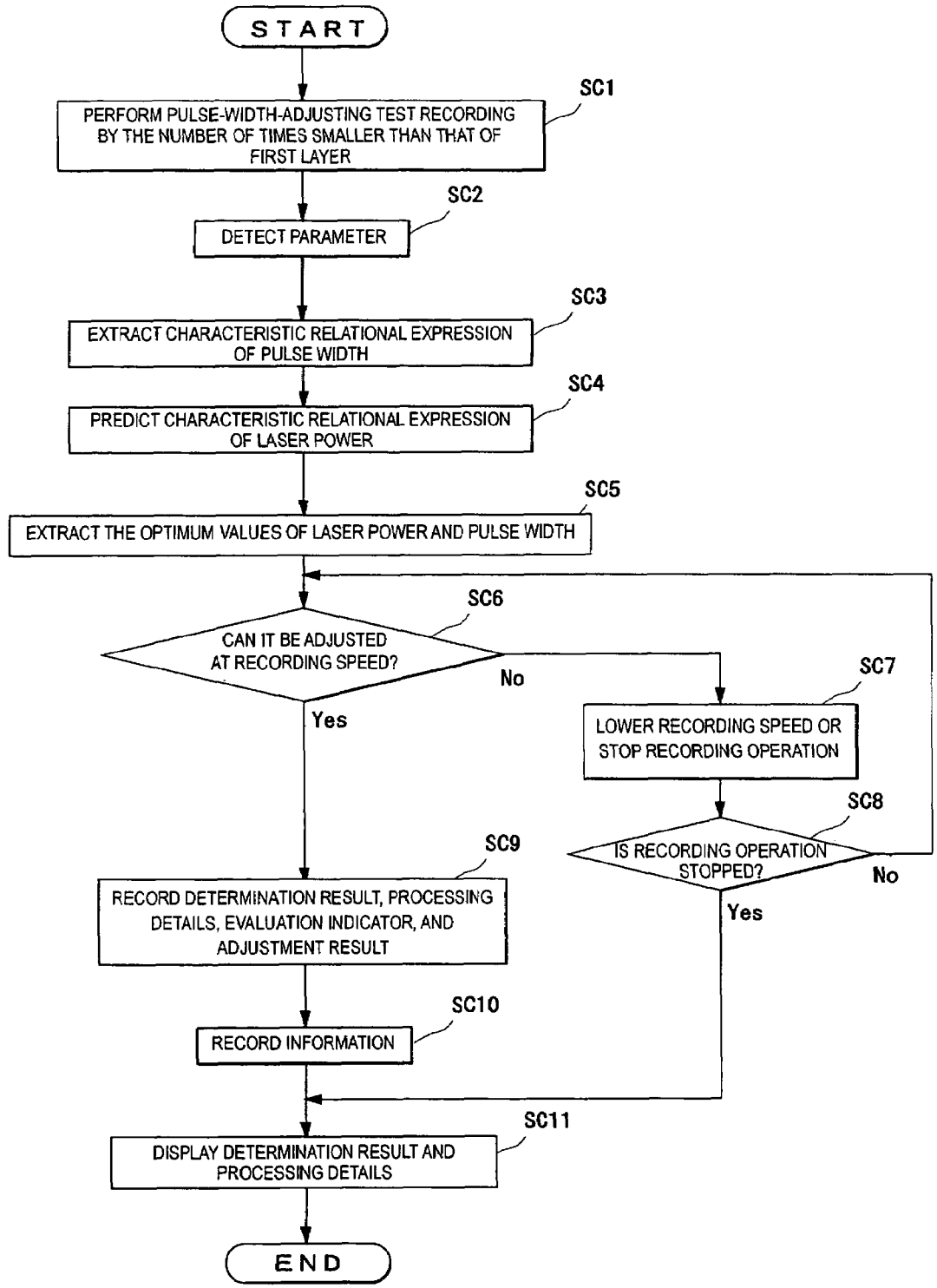
FIG. 15 is a flowchart illustrating a recording operation to a recording layer other than a first recording layer according to a second embodiment.

That is, in the optical recording apparatus 100 according to the second embodiment, the process of recording information on the first recording layer 11 of the optical disk 10 is similar to that of the first embodiment shown in the flowchart of FIG. 2. In the process of recording information on the recording layers 12 and 13 other than the first recording layer 11, as shown in the flowchart of FIG. 15, a test process using one kind of test recording condition of only the pulse-width-adjusting test recording operation is performed by the use of the same OPC as that in the past by the number of times smaller than the number of times for the first recording layer 11, thereby reproducing the recorded data (SC1) and detecting the parameters (evaluation indicators) under the laser beam irradiating condition (SC2). The pulse-width-adjusting test recording operation is performed while gradually varying the pulse width.

Subsequently, a characteristic relational expression is derived from the detected parameters (SC3). For example, the characteristic relational expression indicating a pulse phase correcting parameter in a relation between the positional shift Pulse (Topr, Tlast) of the rising and falling edges of a pulse and the pulse phase is derived which is shown in the graph of FIG. 9.

Thereafter, by using the parameters obtained from the derived characteristic relational expression and the characteristic relational expressions extracted for the first recording layer 11, a characteristic relational expression indicating the pulse phase correcting parameter in a relation between the laser power and the positional shift of a pulse in the other recording layers 12 and 13, that is, the pulse phase correcting parameter in a relation between the laser power Write PW and the pulse phase, which is shown in the graph of FIG. 8, is predicted (SC4).

Subsequently, the optimum values of the laser power and the pulse width are extracted using the extracted characteristic relational expression (SC5). Then, it is determined whether the optimum values can be applied to recording data with predetermined quality after the optimum values are adjusted at a desired recording speed (SC6). In the adjustment, at least one of the laser power and the pulse width of the laser beam to be irradiated to the recording layer is adjusted so that the laser-power-adjusting parameter (evaluation indicator) and the pulse-width-adjusting parameter (evaluation indicator) become predetermined values suitable for recording data with predetermined quality with gradual variations in the recording conditions of laser power and pulse width. The OPC may be performed in the adjustment.

When it is determined in SC6 that the optimum values can be applied, the process of SC9 to be described later is performed. When it is determined that the optimum values cannot be applied, a predetermined recording speed obtained by lowering the recording speed is set or the recording operation is stopped (SC7) and then it is determined whether the recording operation is stopped (SC8). When it is determined that the recording operation is stopped, the process of SC11 to be described later is performed and when the lowered recording speed is set, the process of SC6 is performed. When the optimum values cannot be applied even by lowering the recording speed, the process of SC1 and the processes subsequent thereto may be performed again.

When it is determined in SC6 that the optimum values can be applied to the desired recording speed, the determination result, the processing details, and information on the parameters (evaluation indicators) and the adjustment result are recorded on the optical disk 10 and are recorded in the memory unit 127 to have a correlation with a medium ID of the optical disk 10 (SC9). In this way, by leaving the information as a record, the information can be utilized to record data on the same type of optical disk 10. Condition data used for the test recording operation may be recorded to correspond to the information. The information may be recorded in only any one of the optical disk 10 and the memory unit 127. Information on only any one of the determination result and the processing details accompanied with the determination may be recorded, or information on only any one of the parameters (evaluation indicators) and the adjustment result using the parameters may be recorded.

Then, data are recorded on the optical disk 10 by the use of the optimum values (SC10). Subsequently, the determination result and the processing details are displayed on the display unit 131 (SC12) and then the data recording operation to the second or third recording layer 12 or 13 is ended. Only any one of the determination result and the processing details accompanied with the determination may be displayed on the display unit 131.

According to the first embodiment, the test information is recorded on and reproduced from the first recording layer 11 with a change in type of a recording condition, the irradiation condition suitable for recording information on the first recording layer 11 is extracted on the basis of the obtained test result, the test information is recorded on and reproduced from the second and third recording layers 12 and 13 in the number of times smaller than the number of times for changing the types of test recording conditions for the first recording layer, the irradiation condition suitable for recording information on the second or third recording layer 12 or 13 is extracted on the basis of the test result of the first recording layer 11 and the test result of the second or third recording layer 12 or 13, and information is recorded on the second or third recording layer 12 or 13 by the use of the extracted irradiation condition. Accordingly, it is possible to reduce the test time for extracting the irradiation condition of the second and third recording layers 12 and 13 and thus to reduce the test time before recording information, thereby recording information for a short time.

In the test recording operation of the second or third recoding layer 12 or 13, since only the test process with a change in pulse width is performed, it is possible to further reduce the test time.

As described above, in the general test recording operation, the characteristic relation between the laser power and D is obtained by the laser-power-adjusting test process, the optimum laser power is extracted from the characteristic relation, the characteristic relation between the pulse and the phase shift is obtained by the pulse-width-adjusting test process, and the optimum pulse width, that is, a strategy, is extracted from the characteristic relation. However, in the second embodiment, by performing only the pulse-width-adjusting test process to the recording layers other than the first recording layer 11, the number of test recording conditions is decreased to reduce the test time, and then it is possible to extract the strategy having the optimum laser power and the optimum pulse width.

In the above-mentioned embodiment, a well-known multi-layered DVD has been used as the optical disk 10. However, similarly to the first embodiment, even when an HD-DVD or a well-known blue-ray disk is used as the optical disk 10, the same advantages can be obtained by the same processes.

Next, a third embodiment will be described.

The apparatus configuration of the third embodiment is basically similar to that of the first embodiment, but is different from that of the first embodiment, in that a CPU 125 storing a computer program including a different recording operation to the recording layers 11, 12, and 13 of the optical disk 10 is used in the third embodiment. In the following description, the same elements as the first embodiment are denoted by the same reference numerals.

Figure 16:
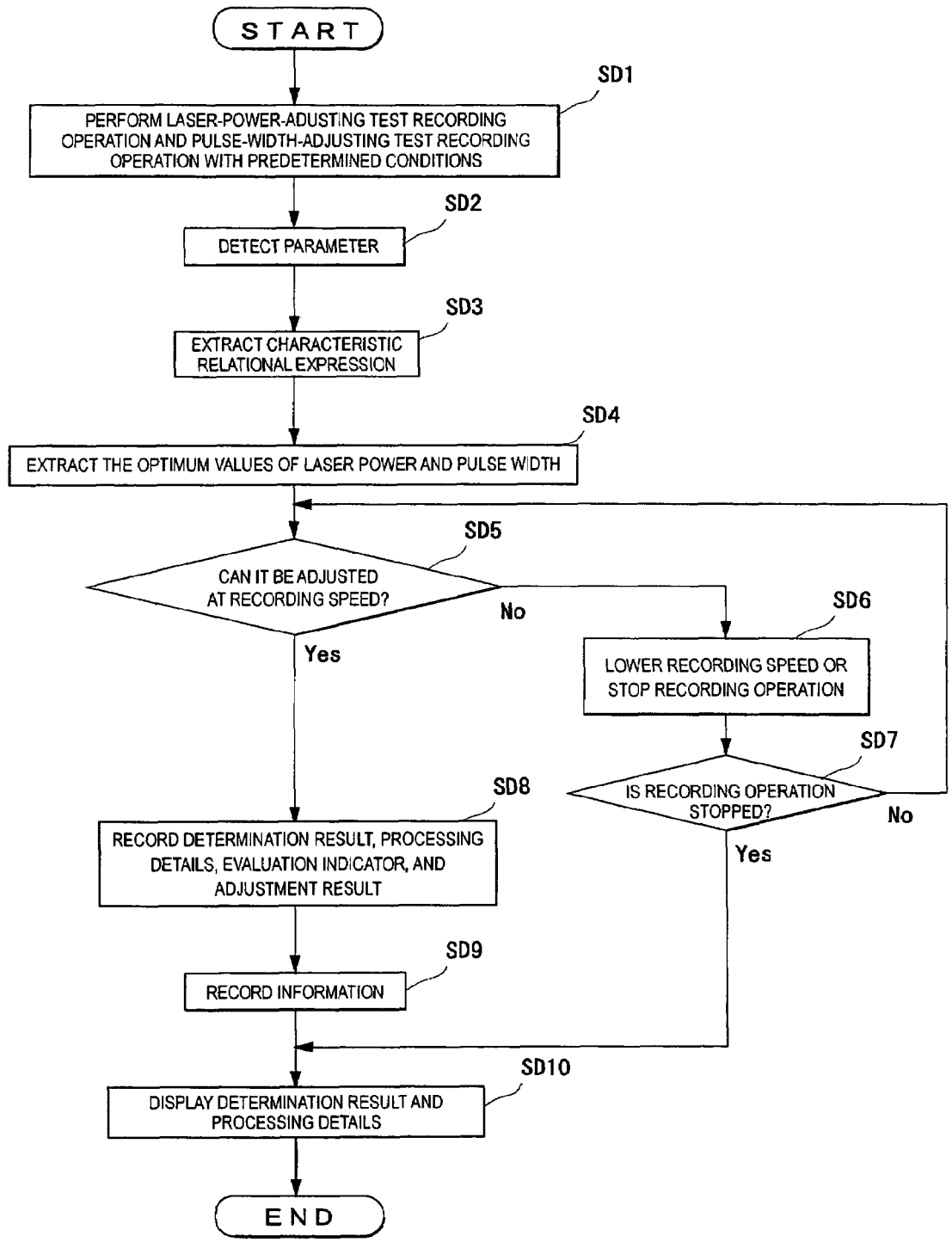
FIG. 16 is a flowchart illustrating a recording operation to a first recording layer according to a third embodiment.
Figure 17:
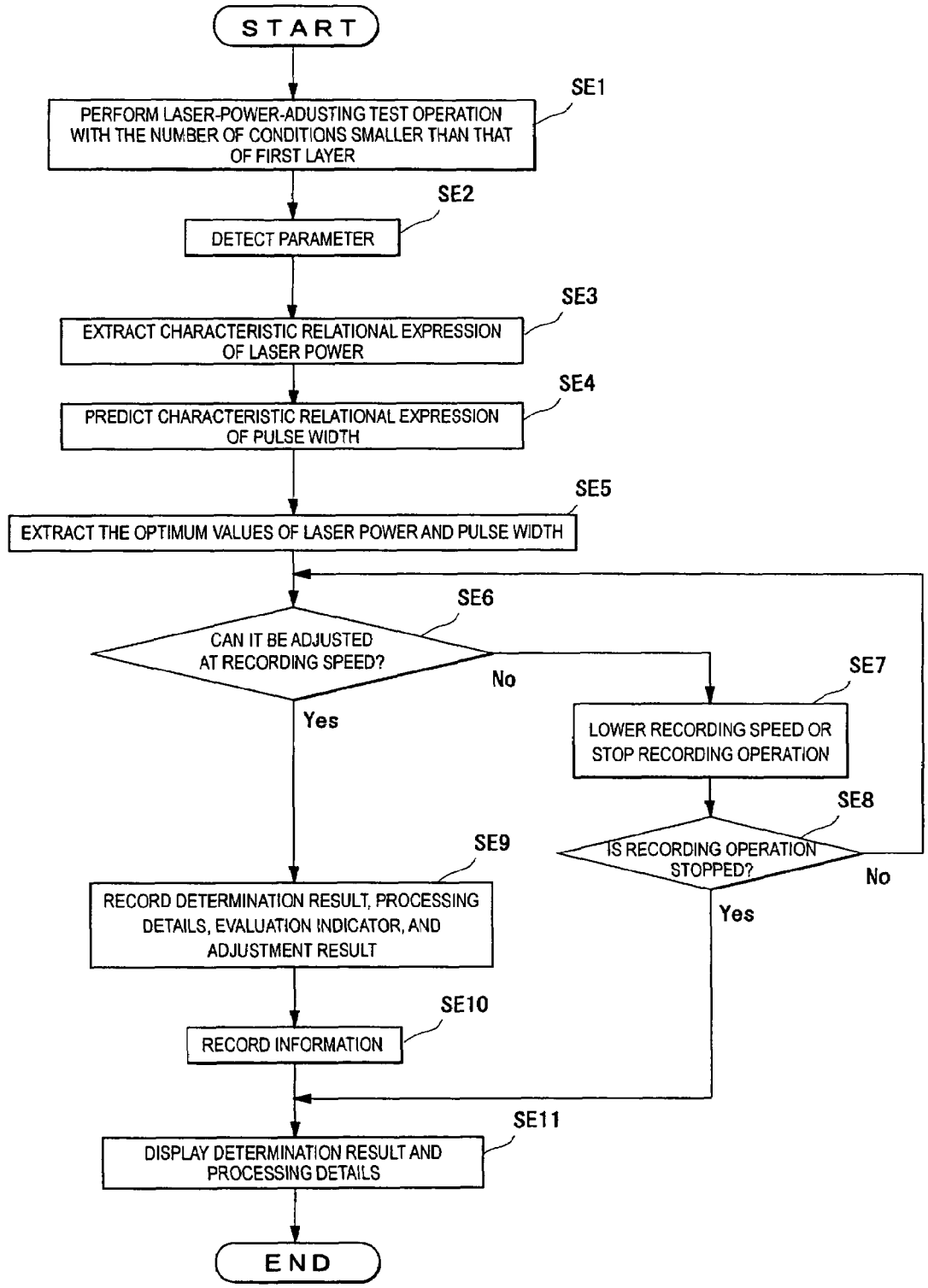
FIG. 17 is a flowchart illustrating a recording operation to a recording layer other than the first recording layer according to the third embodiment.

FIGS. 16 and 17 are flowcharts illustrating a recording operation to a recording layer according to the third embodiment. A computer program for performing the process is stored in advance in the memory circuit 126 of the CPU 125 and the process is performed by the CPU 125. In the third embodiment, the test process at the time of recording data on the first recording layer 11 of the optical disk 10 is almost the same as that of the past, but the test process at the time of recording data on a recording layer other than the first recording layer 11 is different from the test process for the first recording layer 11 so as to reduce the test time.

That is, when recording data on the first recording layer 11, the process shown in the flowchart of FIG. 16 is performed. In the initial process, by performing a test process using two types of test recording conditions including a predetermined number of conditions of the laser-power-adjusting test recording operation and a predetermined number of conditions of the pulse-width-adjusting test recording operation by the use of the same OPC as that in the past, the recorded data are reproduced (SD1) and parameters (evaluation indicators) of the laser beam irradiating conditions are detected (SD2).

For example, the laser-power-adjusting test recording operation is performed in 10 conditions in which the laser power is 1 mW, 2 mW, . . . , and 10 mW. The pulse-width-adjusting test recording operation is similarly performed in 10 different conditions.

In case of DVD, examples of the parameters can include $\beta$ (asymmetry), a laser beam irradiating power, and a pulse phase. The laser-power-adjusting test recording operation is performed while gradually varying the laser power Write PW, as shown in FIG. 4, and the pulse-width-adjusting test recording operation is performed while gradually varying the pulse width. When the data of the strategy table stored in the memory unit 127 can be used at the time of detecting the parameters, the data are used, and when the optical disk 10 is an unknown type of optical disk for which the data of the strategy table stored in the memory 127 cannot be used, a well-known automatic strategy detecting process is performed.

Subsequently, a characteristic relational expression is derived from the detected parameters (SD3). Examples of the characteristic relational expression can include a characteristic relational expression indicating a relation between the laser power Write PW and $\beta$, which is shown in the graph of FIG. 5, a characteristic relational expression indicating a phase correcting parameter in a relation between the laser power write PW and the pulse phase, which is shown in the graph of FIG. 6, and a characteristic relational expression indicating a pulse phase correcting parameter in a relation between positional shift Pulse (Topr, Tlast) of the rising and falling edges of a pulse and pulse phase, which is shown in the graph of FIG. 7. Here, two kinds of parameters (evaluation parameters), that is, the characteristic relational expression indicating the relation between the laser power Write PW and $\beta$, which is shown in the graph of FIG. 5, and the characteristic relational expression indicating the phase correcting parameter in a relation between the laser power Write PW and the pulse phase, which is shown in the graph of FIG. 6, are extracted from the test information recorded with the gradual variation of the laser power.

Thereafter, the optimum values of the laser power and the pulse width are extracted using the parameters obtained from the extracted characteristic relational expressions (SD4). Then, it is determined whether the optimum values can be applied to recording data with predetermined quality after the optimum values are adjusted at a desired recording speed (SD5). In the adjustment, at least one of the laser power and the pulse width of the laser beam to be irradiated to the recording layer is adjusted so that a laser-power-adjusting parameter (evaluation indicator) and a pulse-width-adjusting parameter (evaluation indicator) become predetermined values suitable for recording data with predetermined quality with respect to gradual variations in the recording conditions of laser power and pulse width. The OPC may be performed in the adjustment.

When it is determined in SD5 that the optimum values can be applied, the process of SD8 to be described later is performed. When it is determined that the optimum values cannot be applied, a predetermined recording speed obtained by lowering the recording speed is set or the recording operation is stopped (SD6) and then it is determined whether the recording operation is stopped (SD7). When it is determined that the recording operation is stopped, the process of SD10 to be described later is performed and when the lowered recording speed is set, the process of SD5 is performed.

When it is determined in SD5 that the optimum values can be applied to the desired recording speed, the determination result, the processing details, and information on the parameters (evaluation indicators) and the adjustment result are recorded on the optical disk 10 and are recorded in the memory unit 127 to have a correlation with a medium ID of the optical disk 10 (SD8). In this way, by leaving the information as a record, the information can be utilized to record data on the same type of optical disk 10. Condition data used for the test recording operation may be recorded to correspond to the information. The information may be recorded in only any one of the optical disk 10 and the memory unit 127. Information on only any one of the determination result and the processing details accompanied with the determination may be recorded, or information on only any one of the parameters (evaluation indicators) and the adjustment result using the parameters may be recorded.

Then, data are recorded on the optical disk 10 by the use of the optimum values (SD9). Subsequently, the determination result and the processing details are displayed on the display unit 131 (SD10) and then the data recording operation to the first recording layer 11 is ended. Only any one of the determination result and the processing details accompanied with the determination may be displayed on the display unit 131.

When data are recorded on the recording layers 12 and 13 other than the first recording layer 11, the process shown in the flowchart of FIG. 17 is performed.

That is, when data are recorded on the recording layers 12 and 13 other than the first recording layer 11, the process shown in FIG. 17 is performed. In the process, a test process using one kind of test recording condition of only the laser-power-adjusting test recording operation is performed by the use of the same OPC as that in the past by the number of conditions smaller than the number of conditions for the first recording layer 11, thereby reproducing the recorded data (SE1) and detecting the parameters (evaluation indicators) under the laser beam irradiating condition (SE2). The laser-power-adjusting test recording operation is performed while gradually varying the laser power Write PW as shown in FIG. 4. Here, the test process is performed using 5 conditions of the 10 conditions (1 mW, . . . , 10 mW) used in the test recording operation of the first recording layer 11.

Subsequently, a characteristic relational expression is derived from the detected parameters (SE3). For example, the characteristic relational expression indicating a phase correcting parameter in a relation between the laser power write PW and the pulse phase is derived which is shown in the graph of FIG. 8.

Thereafter, by using the parameters obtained from the derived characteristic relational expression and the characteristic relational expressions extracted for the first recording layer 11, a characteristic relational expression indicating the pulse phase correcting parameter in a relation between the positional shift of a pulse and the pulse phase in other recording layers 12 and 13, that is, the pulse phase correcting parameter in a relation between the positional shift Pulse (Topr, Tlast) of the rising and falling edges of a pulse and the pulse phase, which is shown in the graph of FIG. 9, is predicted (SE4).

Subsequently, the optimum values of the laser power and the pulse width are extracted using the extracted characteristic relational expressions (SE5). Then, it is determined whether the optimum values can be applied to recording data with predetermined quality after the optimum values are adjusted at a desired recording speed (SE6). In the adjustment, at least one of the laser power and the pulse width of the laser beam to be irradiated to the recording layer is adjusted so that a laser-power-adjusting parameter (evaluation indicator) and a pulse-width-adjusting parameter (evaluation indicator) become predetermined values suitable for recording data with predetermined quality with respect to gradual variations in the recording conditions of laser power and pulse width. The OPC may be performed in the adjustment.

When it is determined in SE6 that the optimum values can be applied, the process of SE9 to be described later is performed. When it is determined that the optimum values cannot be applied, a predetermined recording speed obtained by lowering the recording speed is set or the recording operation is stopped (SE7) and then it is determined whether the recording operation is stopped (SE8). When it is determined that the recording operation is stopped, the process of SE11 to be described later is performed and when the lowered recording speed is set, the process of SE6 is performed. When the optimum values cannot be applied even by lowering the recording speed, the process of SE1 and the processes subsequent thereto may be performed again instead of stopping the recording operation.

When it is determined in SE6 that the optimum values can be applied to the desired recording speed, the determination result, the processing details, and information on the parameters (evaluation indicators) and the adjustment result are recorded on the optical disk 10 and are recorded in the memory unit 127 to have a correlation with a medium ID of the optical disk 10 (SE9).

Then, data are recorded on the optical disk 10 by the use of the optimum values (SE10). Subsequently, the determination result and the processing details are displayed on the display unit 131 (SE12) and then the data recording operation to the second or third recording layer 12 or 13 is ended.

According to the embodiment, the test information is recorded on and reproduced from the first recording layer 11 with ten times of a change in type of a recording condition, the irradiation condition suitable for recording information on the first recording layer 11 is extracted on the basis of the obtained test result, the test information is recorded on and reproduced from the other recording layers 12 and 13 in 5 conditions smaller than the number of test recording conditions for the first recording layer, the irradiation condition suitable for recording information on the second or third recording layer 12 or 13 is extracted on the basis of the test result of the first recording layer 11 and the test result of the second or third recording layer 12 or 13, and information is recorded on the second or third recording layer 12 or 13 by the use of the extracted irradiation condition. Accordingly, it is possible to reduce the test time for extracting the irradiation condition of the second and third recording layers 12 and 13 and thus to reduce the test time before recording information, thereby recording information for a short time.

In the test recording operation of the second or third recoding layer 12 or 13, since only the test process with a change in laser power is performed but the test process with a change in pulse width which requires much time and a large test area is not performed, it is possible to further reduce the test time.

As described above, in the general test recording operation, the characteristic relation between the laser power and β is obtained by the laser-power-adjusting test process, the optimum laser power is extracted from the characteristic relation, the characteristic relation between the pulse and the phase shift is obtained by the pulse-width-adjusting test process, and the optimum pulse width, that is, a strategy, is extracted from the characteristic relation. However, in the third embodiment, by performing only the laser-power-adjusting test process to the recording layers other than the first recording layer 11 with the decreased number of conditions, it is possible to extract the strategy having the optimum laser power and the optimum pulse width.

In the above-mentioned embodiment, a well-known multi-layered DVD has been used as the optical disk 10. However, even when an HD-DVD or a well-known blue-ray disk used as the optical disk 10, the same advantages can be obtained by the same processes.

Next, a fourth embodiment will be described.

The apparatus configuration of the fourth embodiment is basically similar to that of the first embodiment, but is different from that of the first embodiment, in that a CPU 125 storing a computer program in which a recording operation to the recording layers 12 and 13 other than the first recording layer 11 is partially different from that of the third embodiment is used in the fourth embodiment. In the following description, the same elements as the first embodiment are denoted by the same reference numerals.

Figure 18:
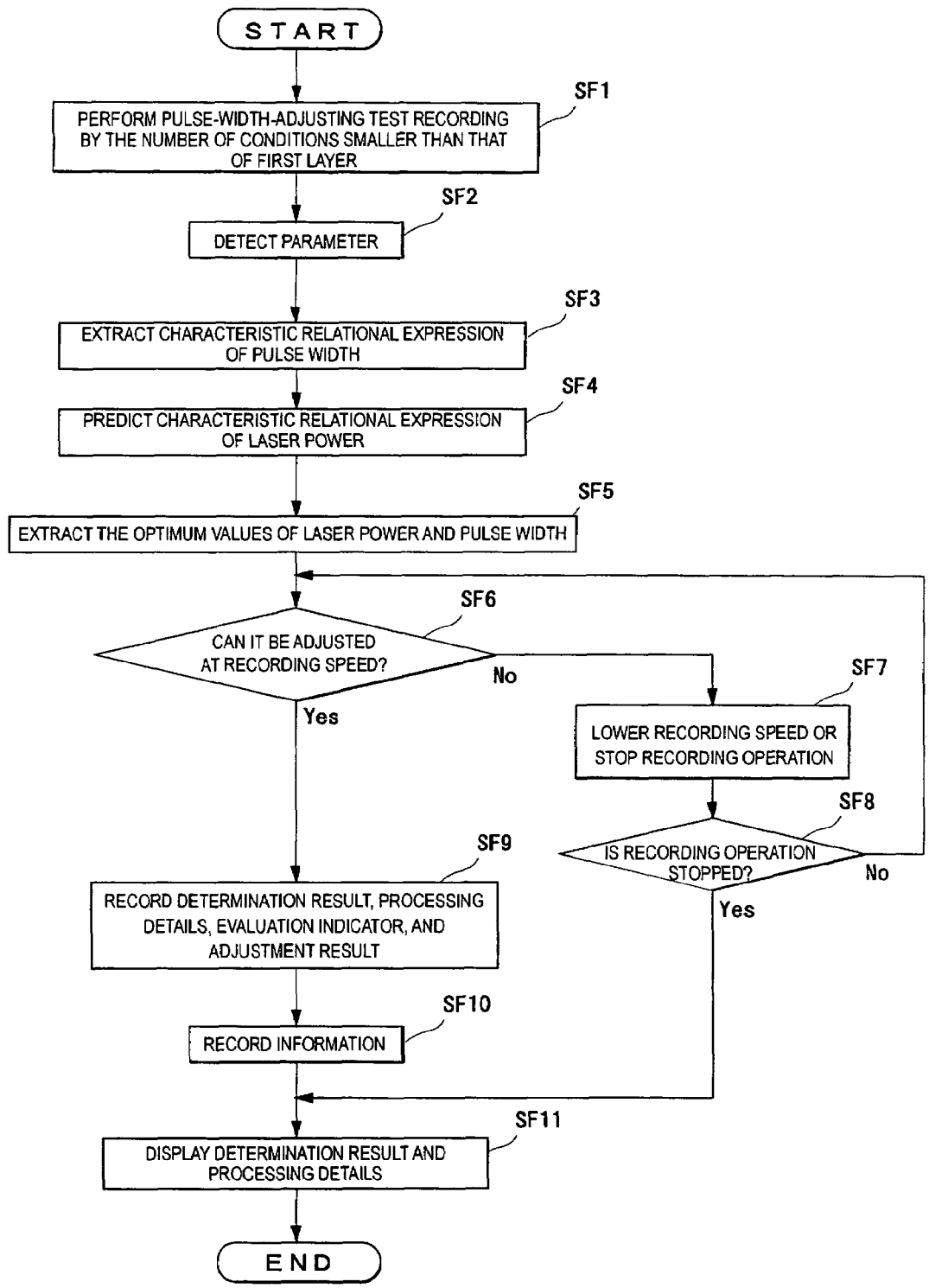
FIG. 18 is a flowchart illustrating a recording operation to a recording layer other than a first recording layer according to a fourth embodiment.

That is, in the optical recording apparatus 100 according to the fourth embodiment, the process of recording information on the first recording layer 11 of the optical disk 10 is similar to that of the third embodiment shown in the flowchart of FIG. 16. In the process of recording information on the recording layers 12 and 13 other than the first recording layer 11, as shown in the flowchart of FIG. 18, a test process using one kind of test recording condition of only the pulse-width-adjusting test recording operation is performed by the use of the same OPC as that in the past in the number of conditions smaller than the number of conditions for the first recording layer 11, thereby reproducing the recorded data (SF1) and detecting the parameters (evaluation indicators) under the laser beam irradiating condition (SF2). The pulse-width-adjusting test recording operation is performed while gradually varying the pulse width. Here, the test recording operation is performed using 5 conditions of 10 pulse width conditions used in the test recording operation to the first recording layer 11.

Subsequently, a characteristic relational expression is derived from the detected parameters (SF3). For example, the characteristic relational expression indicating a pulse phase correcting parameter in a relation between the positional shift Pulse (Topr, Tlast) of the rising and falling edges of a pulse and the pulse phase is derived which is shown in the graph of FIG. 9.

Thereafter, by using the parameters obtained from the derived characteristic relational expression and the characteristic relational expressions extracted for the first recording layer 11, a characteristic relational expression indicating the pulse phase correcting parameter in a relation between the laser power and the pulse width in the other recording layers 12 and 13, that is, the pulse phase correcting parameter in a relation between the laser power Write PW and the pulse phase, which is shown in the graph of FIG. 8, is predicted (SF4).

Subsequently, the optimum values of the laser power and the pulse width are extracted using the extracted characteristic relational expression (SF5). Then, it is determined whether the optimum values can be applied to recording data with predetermined quality after the optimum values are adjusted at a desired recording speed (SF6). In the adjustment, at least one of the laser power and the pulse width of the laser beam to be irradiated to the recording layer is adjusted so that the laser-power-adjusting parameter (evaluation indicator) and the pulse-width-adjusting parameter (evaluation indicator) become predetermined values suitable for recording data with predetermined quality with gradual variations in the recording conditions of laser power and pulse width. The OPC may be performed in the adjustment.

When it is determined in SF6 that the optimum values can be applied, the process of SF9 to be described later is performed. When it is determined that the optimum values cannot be applied, a predetermined recording speed obtained by lowering the recording speed is set or the recording operation is stopped (SF7) and then it is determined whether the recording operation is stopped (SF8). When it is determined that the recording operation is stopped, the process of SF11 to be described later is performed and when the lowered recording speed is set, the process of SF6 is performed. When the optimum values cannot be applied even by lowering the recording speed, the process of SF1 and the processes subsequent thereto may be performed again instead of stopping the recording operation.

When it is determined in SF6 that the optimum values can be applied to the desired recording speed, the determination result, the processing details, and information on the parameters (evaluation indicators) and the adjustment result are recorded on the optical disk 10 and are recorded in the memory unit 127 to have a correlation with a medium ID of the optical disk 10 (SF9). In this way, by leaving the information as a record, the information can be utilized to record data on the same type of optical disk 10. Condition data used for the test recording operation may be recorded to correspond to the information. The information may be recorded in only any one of the optical disk 10 and the memory unit 127. Information on only any one of the determination result and the processing details accompanied with the determination may be recorded, or information on only any one of the parameters (evaluation indicators) and the adjustment result using the parameters may be recorded.

Then, data are recorded on the optical disk 10 by the use of the optimum values (SF10). Subsequently, the determination result and the processing details are displayed on the display unit 131 (SF12) and then the data recording operation to the second or third recording layer 12 or 13 is ended. Only any one of the determination result and the processing details accompanied with the determination may be displayed on the display unit 131.

According to the fourth embodiment, the test information is recorded on and reproduced from the first recording layer 11 in the test recording condition accompanied with 10 times of a change in condition, the irradiation condition suitable for recording information on the first recording layer 11 is extracted on the basis of the obtained test result, the test information is recorded on and reproduced from the other recording layers 12 and 13 in 5 conditions smaller than the number of conditions used in the test recording operation to the first recording layer, the irradiation condition suitable for recording information on the second or third recording layer 12 or 13 is extracted on the basis of the test result of the first recording layer 11 and the test result of the second or third recording layer 12 or 13, and information is recorded on the second or third recording layer 12 or 13 by the use of the extracted irradiation condition. Accordingly, it is possible to reduce the test time for extracting the irradiation condition of the second and third recording layers 12 and 13 and thus to reduce the test time before recording information, thereby recording information for a short time.

In the test recording operation of the second or third recording layer 12 or 13, since only the test process with a change in pulse width is performed, it is possible to further reduce the test time.

As described above, in the general test recording operation, the characteristic relation between the laser power and β is obtained by the laser-power-adjusting test process, the optimum laser power is extracted from the characteristic relation, the characteristic relation between the pulse and the phase shift is obtained by the pulse-width-adjusting test process, and the optimum pulse width, that is, a strategy, is extracted from the characteristic relation. However, in the fourth embodiment, by performing only the pulse-width-adjusting test process to the recording layers other than the first recording layer 11, the number of test recording conditions is decreased to reduce the test time, and then it is possible to extract the strategy having the optimum laser power and the optimum pulse width.

In the above-mentioned embodiment, a well-known multi-layered DVD has been used as the optical disk 10. However, similarly to the first embodiment, even when an HD-DVD or a well-known blue-ray disk is used as the optical disk 10, the same advantages can be obtained by the same processes.

Next, a fifth embodiment will be described.

The apparatus configuration of the fifth embodiment is basically similar to that of the first embodiment, but is different from that of the first embodiment, in that a CPU 125 storing a computer program including a different recording operation to the recording layers 11, 12, and 13 of the optical disk 10 is used in the fifth embodiment. In the following description, the same elements as the first embodiment are denoted by the same reference numerals.

Figure 19:
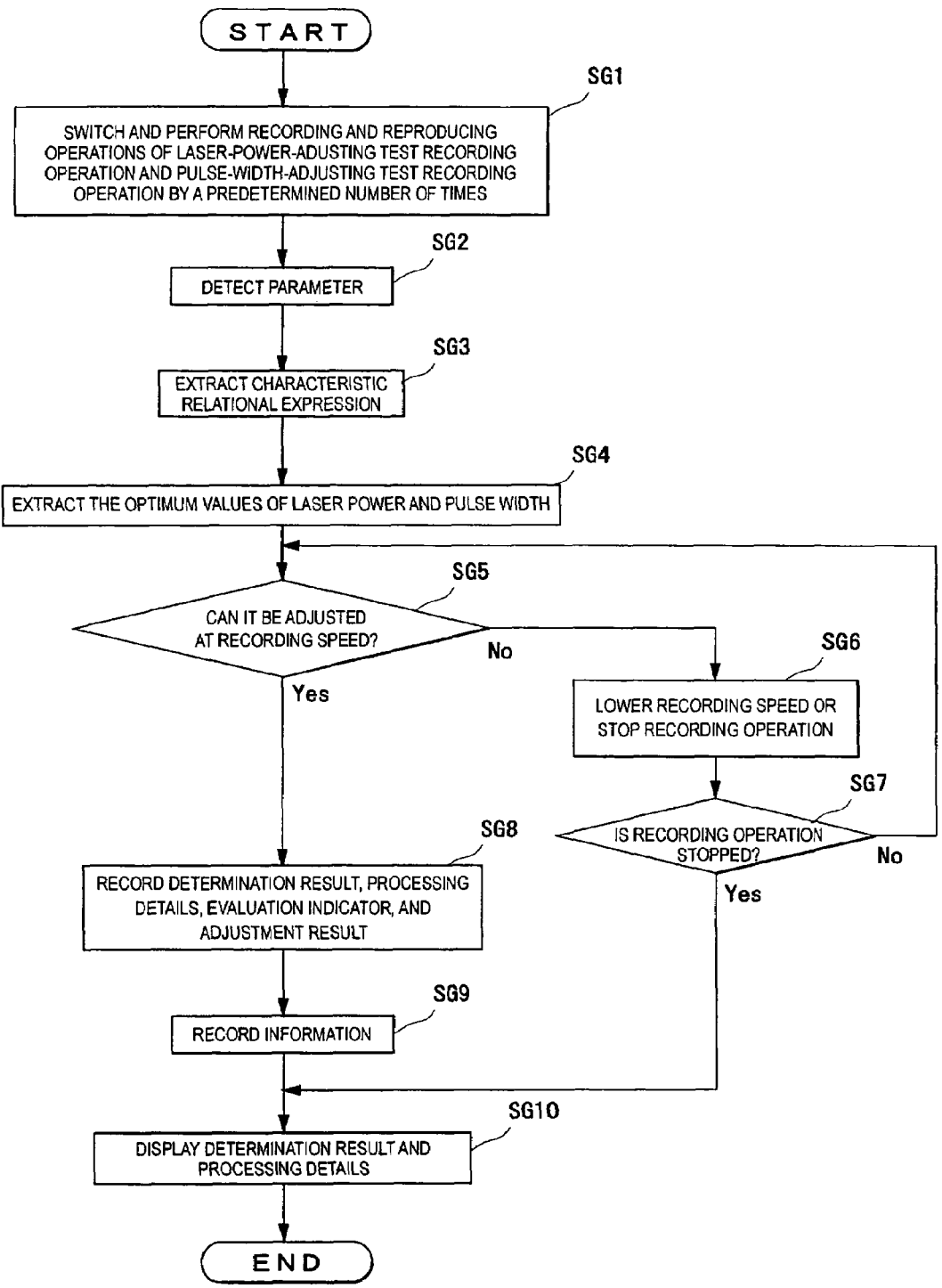
FIG. 19 is a flowchart illustrating a recording operation to a first recording layer according to a fifth embodiment.
Figure 20:
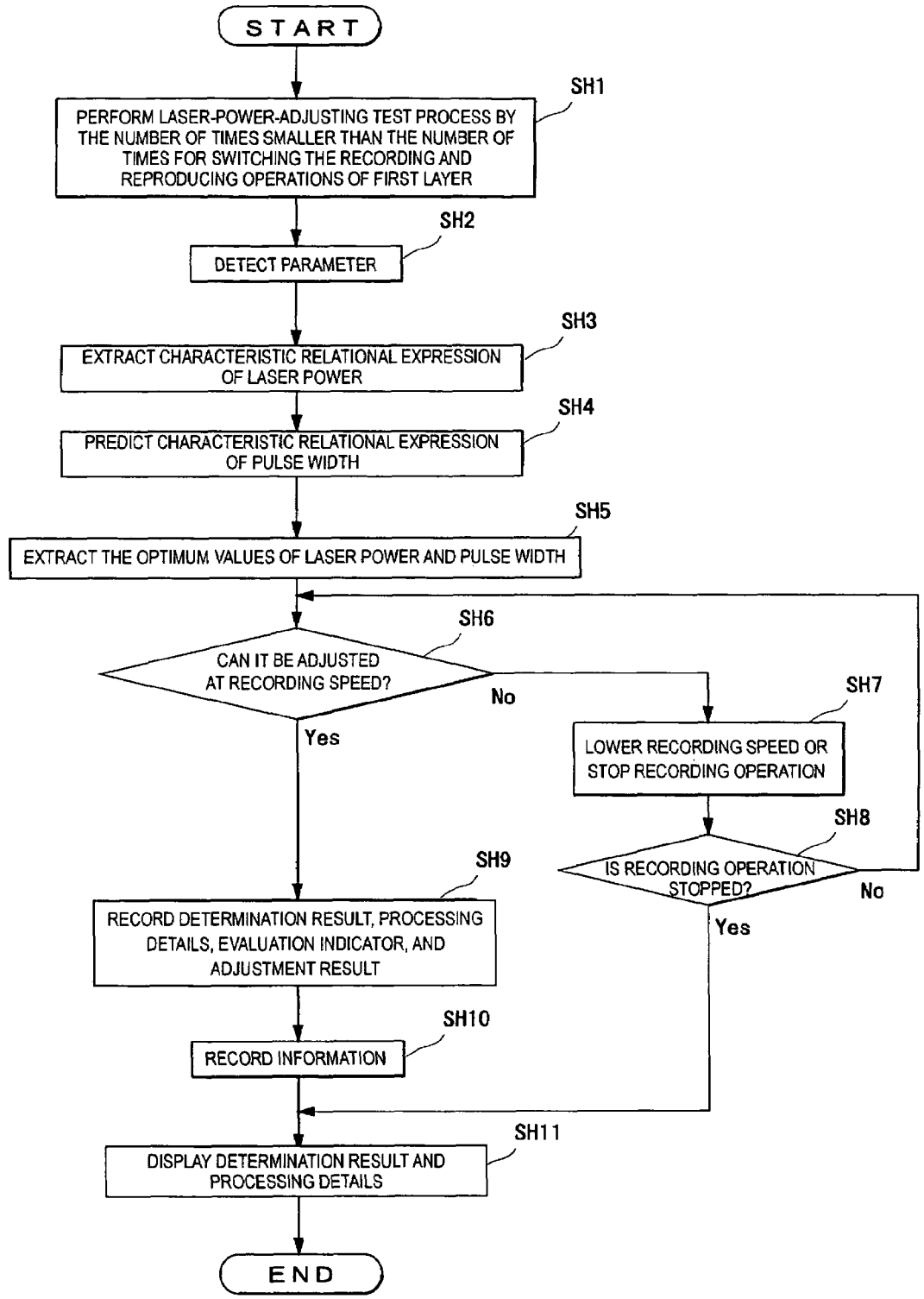
FIG. 20 is a flowchart illustrating a recording operation to a recording layer other than the first recording layer according to the fifth embodiment.

FIGS. 19 and 20 are flowcharts illustrating a recording operation to a recording layer according to the fifth embodiment. A computer program for performing the process is stored in advance in the memory circuit 126 of the CPU 125 and the process is performed by the CPU 125. In the fifth embodiment, the test process at the time of recording data on the first recording layer 11 of the optical disk 10 is almost the same as that of the past, but the test process at the time of recording data on a recording layer other than the first recording layer 11 is different from the test process for the first recording layer 11 so as to reduce the test time.

That is, when recording data on the first recording layer 11, the process shown in the flowchart of FIG. 19 is performed. In the process, by performing a test process using two types of test recording conditions including the laser-power-adjusting test recording operation and the pulse-width-adjusting test recording operation by the use of the same OPC as that in the past, the recorded data are reproduced (SG1) and parameters (evaluation indicators) of the laser beam irradiating conditions are detected (SG2). At this time, the recording and reproducing operations are switched and performed by a predetermined number of times. In case of DVD, examples of the parameters can include β (asymmetry), a laser beam irradiating power, and a pulse phase. The laser-power-adjusting test recording operation is performed while gradually varying the laser power Write PW, as shown in FIG. 4, and the pulse-width-adjusting test recording operation is performed while gradually varying the pulse width. When the data of the strategy table stored in the memory unit 127 can be used at the time of detecting the parameters, the data are used, and when the optical disk 10 is an unknown type of optical disk for which the data of the strategy table stored in the memory 127 cannot be used, a well-known automatic strategy detecting process is performed.

Subsequently, a characteristic relational expression is derived from the detected parameters (SG3). Examples of the characteristic relational expression can include a characteristic relational expression indicating a relation between the laser power Write PW and β, which is shown in the graph of FIG. 5, a characteristic relational expression indicating a phase correcting parameter in a relation between the laser power write PW and the pulse phase, which is shown in the graph of FIG. 6, and a characteristic relational expression indicating a pulse phase correcting parameter in a relation between positional shift Pulse (Topr, Tlast) of the rising and falling edges of a pulse and pulse phase, which is shown in the graph of FIG. 7. Here, two kinds of parameters (evaluation parameters), that is, the characteristic relational expression indicating the relation between the laser power Write PW and β, which is shown in the graph of FIG. 5, and the characteristic relational expression indicating the phase correcting parameter in a relation between the laser power Write PW and the pulse phase, which is shown in the graph of FIG. 6, are extracted from the test information recorded with the gradual variation of the laser power.

Thereafter, the optimum values of the laser power and the pulse width are extracted using the parameters obtained from the extracted characteristic relational expressions (SG4). Then, it is determined whether the optimum values can be applied to recording data with predetermined quality after the optimum values are adjusted at a desired recording speed (SG5). In the adjustment, at least one of the laser power and the pulse width of the laser beam to be irradiated to the recording layer is adjusted so that a laser-power-adjusting parameter (evaluation indicator) and a pulse-width-adjusting parameter (evaluation indicator) become predetermined values suitable for recording data with predetermined quality with respect to gradual variations in the recording conditions of laser power and pulse width. The OPC may be performed in the adjustment.

When it is determined in SG5 that the optimum values can be applied, the process of SG8 to be described later is performed. When it is determined that the optimum values cannot be applied, a predetermined recording speed obtained by lowering the recording speed is set or the recording operation is stopped (SG6) and then it is determined whether the recording operation is stopped (SG7). When it is determined that the recording operation is stopped, the process of SG10 to be described later is performed and when the lowered recording speed is set, the process of SG5 is performed.

When it is determined in SG5 that the optimum values can be applied to the desired recording speed, the determination result, the processing details, and information on the parameters (evaluation indicators) and the adjustment result are recorded on the optical disk 10 and are recorded in the memory unit 127 to have a correlation with a medium ID of the optical disk 10 (SG8). In this way, by leaving the information as a record, the information can be utilized to record data on the same type of optical disk 10. Condition data used for the test recording operation may be recorded to correspond to the information. The information may be recorded in only any one of the optical disk 10 and the memory unit 127. Information on only any one of the determination result and the processing details accompanied with the determination may be recorded, or information on only any one of the parameters (evaluation indicators) and the adjustment result using the parameters may be recorded.

Then, data are recorded on the optical disk 10 by the use of the optimum values (SG9). Subsequently, the determination result and the processing details are displayed on the display unit 131 (SG10) and then the data recording operation to the first recording layer 11 is ended. Only any one of the determination result and the processing details accompanied with the determination may be displayed on the display unit 131.

That is, when data are recorded on the recording layers 12 and 13 other than the first recording layer 11, the process shown in the flowchart of FIG. 20 is performed. In the process, a test process using one kind of test recording condition of only the laser-power-adjusting test recording operation is performed by the use of the same OPC as that in the past by the number of switching smaller than the number of switching of the recording and reproducing operations for the first recording layer 11, thereby reproducing the recorded data (SH1) and detecting the parameters (evaluation indicators) under the laser beam irradiating condition (SH2). The laser-power-adjusting test recording operation is performed while gradually varying the laser power Write PW as shown in FIG. 4.

Subsequently, a characteristic relational expression is derived from the detected parameters (SH3). For example, the characteristic relational expression indicating a phase correcting parameter in a relation between the laser power write PW and the pulse phase is derived which is shown in the graph of FIG. 8.

Thereafter, by using the parameters obtained from the derived characteristic relational expression and the characteristic relational expressions extracted for the first recording layer 11, a characteristic relational expression indicating the pulse phase correcting parameter in a relation between the positional shift of a pulse and the pulse phase in other recording layers 12 and 13, that is, the pulse phase correcting parameter in a relation between the positional shift Pulse (Topr, Tlast) of the rising and falling edges of a pulse and the pulse phase, which is shown in the graph of FIG. 9, is predicted (SH4).

Subsequently, the optimum values of the laser power and the pulse width are extracted using the extracted characteristic relational expressions (SH5). Then, it is determined whether the optimum values can be applied to recording data with predetermined quality after the optimum values are adjusted at a desired recording speed (SH6). In the adjustment, at least one of the laser power and the pulse width of the laser beam to be irradiated to the recording layer is adjusted so that a laser-power-adjusting parameter (evaluation indicator) and a pulse-width-adjusting parameter (evaluation indicator) become predetermined values suitable for recording data with predetermined quality with respect to gradual variations in the recording conditions of laser power and pulse width. The OPC may be performed in the adjustment.

When it is determined in SH6 that the optimum values can be applied, the process of SH9 to be described later is performed. When it is determined that the optimum values cannot be applied, a predetermined recording speed obtained by lowering the recording speed is set or the recording operation is stopped (SH7) and then it is determined whether the recording operation is stopped (SH8). When it is determined that the recording operation is stopped, the process of SH11 to be described later is performed and when the lowered recording speed is set, the process of SH6 is performed. When the optimum values cannot be applied even by lowering the recording speed, the process of SH1 and the processes subsequent thereto may be performed again instead of stopping the recording operation.

When it is determined in SH6 that the optimum values can be applied to the desired recording speed, the determination result, the processing details, and information on the parameters (evaluation indicators) and the adjustment result are recorded on the optical disk 10 and are recorded in the memory unit 127 to have a correlation with a medium ID of the optical disk 10 (SH9).

Then, data are recorded on the optical disk 10 by the use of the optimum values (SH10). Subsequently, the determination result and the processing details are displayed on the display unit 131 (SH12) and then the data recording operation to the second or third recording layer 12 or 13 is ended.

According to the embodiment, when the test information is recorded on and reproduced from the first recording layer 11 with plural types of test recording conditions, the recording and reproducing operations are switched and performed by a predetermined number of times and the irradiation condition suitable for recording information on the first recording layer 11 is extracted on the basis of the obtained test result. In addition, when the test information is recorded on and reproduced from the other recording layers 12 and 13, the recording and reproducing operations are switched and performed by the number of switching smaller than the number of switching for the first recording layer 11 and the irradiation condition suitable for recording information on the second or third recording layer 12 or 13 is extracted on the basis of the test result of the first recording layer 11 and the test result of the second or third recording layer 12 or 13. Then, information is recorded on the second or third recording layer 12 or 13 by the use of the extracted irradiation condition. Accordingly, it is possible to reduce the test time for extracting the irradiation condition of the second and third recording layers 12 and 13 and thus to reduce the test time before recording information, thereby recording information for a short time.

In the test recording operation of the second or third recoding layer 12 or 13, since only the test process with a change in laser power is performed but the test process with a change in pulse width which requires much time and a large test area is not performed, it is possible to further reduce the test time.

As described above, in the general test recording operation, the characteristic relation between the laser power and β is obtained by the laser-power-adjusting test process, the optimum laser power is extracted from the characteristic relation, the characteristic relation between the pulse and the phase shift is obtained by the pulse-width-adjusting test process, and the optimum pulse width, that is, a strategy, is extracted from the characteristic relation. However, in the third embodiment, by performing only the laser-power-adjusting test process to the recording layers other than the first recording layer 11 with the decreased number of conditions by the reduced number of switching of the recording and reproducing operations, it is possible to extract the strategy having the optimum laser power and the optimum pulse width.

In the above-mentioned embodiment, a well-known multi-layered DVD has been used as the optical disk 10. However, even when an HD-DVD or a well-known blue-ray disk used as the optical disk 10, the same advantages can be obtained by the same processes.

Next, a sixth embodiment will be described.

The apparatus configuration of the sixth embodiment is basically similar to that of the first embodiment, but is different from that of the first embodiment, in that a CPU 125 storing a computer program in which a recording operation to the recording layers 12 and 13 other than the first recording layer 11 is partially different from that of the fifth embodiment is used in the sixth embodiment. In the following description, the same elements as the first embodiment are denoted by the same reference numerals.

Figure 21:
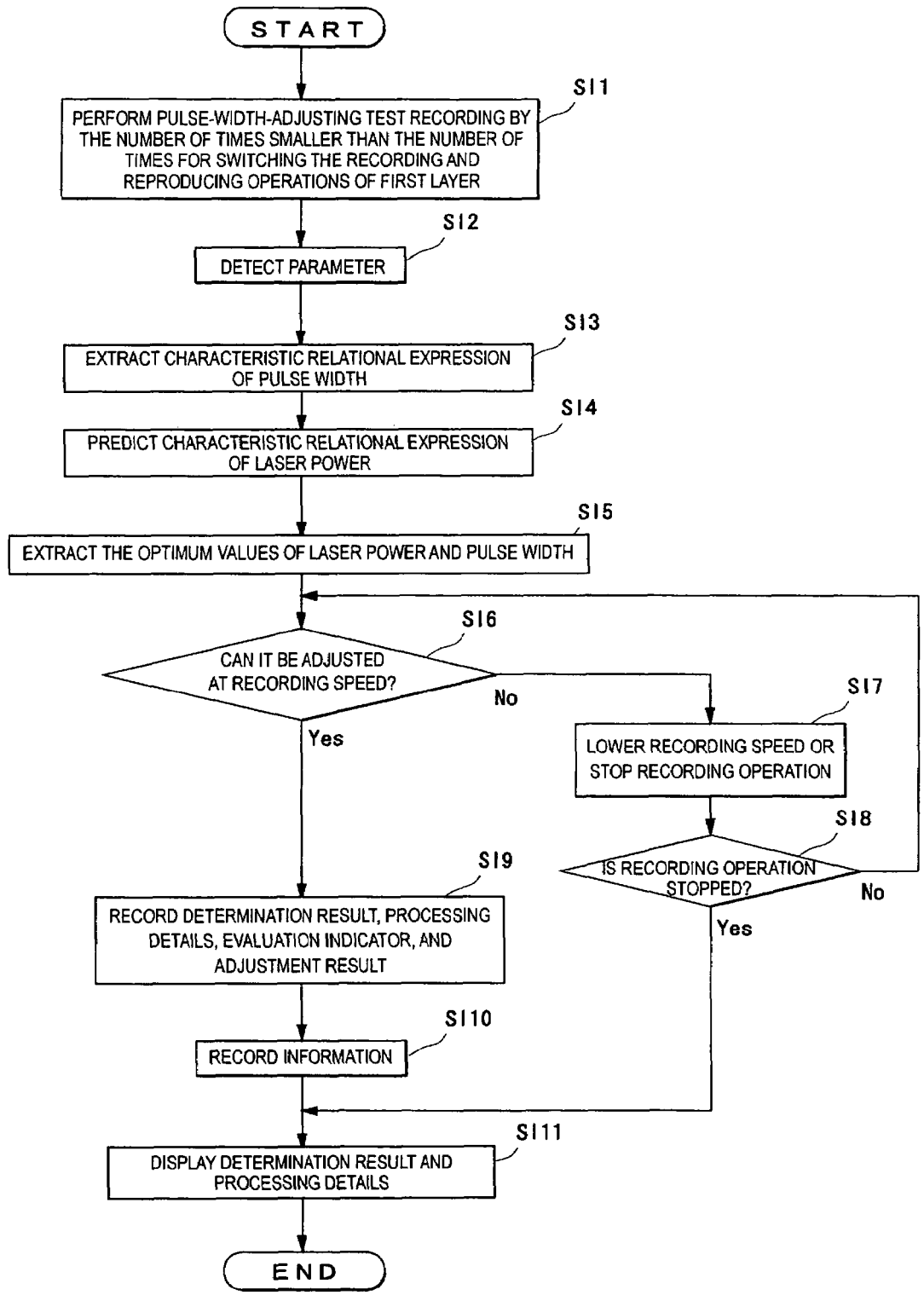
FIG. 21 is a flowchart illustrating a recording operation to a recording layer other than a first recording layer according to a sixth embodiment.

That is, in the optical recording apparatus 100 according to the sixth embodiment, the process of recording information on the first recording layer 11 of the optical disk 10 is similar to that of the fifth embodiment shown in the flowchart of FIG. 19. In the process of recording information on the recording layers 12 and 13 other than the first recording layer 11, as shown in the flowchart of FIG. 21, a test process using one kind of test recording condition of only the pulse-width-adjusting test recording operation is performed by the use of the same OPC as that in the past by the number of switching smaller than the number of switching of the recoding and reproducing operations for the first recording layer 11, thereby reproducing the recorded data (SI1) and detecting the parameters (evaluation indicators) under the laser beam irradiating condition (SI2). The pulse-width-adjusting test recording operation is performed while gradually varying the pulse width.

Subsequently, a characteristic relational expression is derived from the detected parameters (SI3). For example, the characteristic relational expression indicating a pulse phase correcting parameter in a relation between the positional shift Pulse (Topr, Tlast) of the rising and falling edges of a pulse and the pulse phase is derived which is shown in the graph of FIG. 9.

Thereafter, by using the parameters obtained from the derived characteristic relational expression and the characteristic relational expressions extracted for the first recording layer 11, a characteristic relational expression indicating the phase correcting parameter in a relation between the positional shift of a pulse and the pulse phase correcting parameter in the other recording layers 12 and 13, that is, the phase correcting parameter in a relation between the laser power Write PW and the pulse phase, which is shown in the graph of FIG. 8, is predicted (SI4).

Subsequently, the optimum values of the laser power and the pulse width are extracted using the extracted characteristic relational expression (SI5). Then, it is determined whether the optimum values can be applied to recording data with predetermined quality after the optimum values are adjusted at a desired recording speed (SI6). In the adjustment, at least one of the laser power and the pulse width of the laser beam to be irradiated to the recording layer is adjusted so that the laser-power-adjusting parameter (evaluation indicator) and the pulse-width-adjusting parameter (evaluation indicator) become predetermined values suitable for recording data with predetermined quality with gradual variations in the recording conditions of laser power and pulse width. The OPC may be performed in the adjustment.

When it is determined in SI6 that the optimum values can be applied, the process of SI9 to be described later is performed. When it is determined that the optimum values cannot be applied, a predetermined recording speed obtained by lowering the recording speed is set or the recording operation is stopped (SI7) and then it is determined whether the recording operation is stopped (SI8). When it is determined that the recording operation is stopped, the process of SI11 to be described later is performed and when the lowered recording speed is set, the process of SI6 is performed. When the optimum values cannot be applied even by lowering the recording speed, the process of SI1 and the processes subsequent thereto may be performed again instead of stopping the recording operation.

When it is determined in SI6 that the optimum values can be applied to the desired recording speed, the determination result, the processing details, and information on the parameters (evaluation indicators) and the adjustment result are recorded on the optical disk 10 and are recorded in the memory unit 127 to have a correlation with a medium ID of the optical disk 10 (SI9). In this way, by leaving the information as a record, the information can be utilized to record data on the same type of optical disk 10. Condition data used for the test recording operation may be recorded to correspond to the information. The information may be recorded in only any one of the optical disk 10 and the memory unit 127. Information on only any one of the determination result and the processing details accompanied with the determination may be recorded, or information on only any one of the parameters (evaluation indicators) and the adjustment result using the parameters may be recorded.

Then, data are recorded on the optical disk 10 by the use of the optimum values (SI10). Subsequently, the determination result and the processing details are displayed on the display unit 131 (SI12) and then the data recording operation to the second or third recording layer 12 or 13 is ended. Only any one of the determination result and the processing details accompanied with the determination may be displayed on the display unit 131.

According to the embodiment, when the test information is recorded on and reproduced from the first recording layer 11 with plural types of test recording conditions, the recording and reproducing operations are switched and performed by a predetermined number of times and the irradiation condition suitable for recording information on the first recording layer 11 is extracted on the basis of the obtained test result. In addition, when the test information is recorded on and reproduced from the other recording layers 12 and 13, the recording and reproducing operations are switched and performed by the number of switching smaller than the number of switching for the first recording layer 11 and the irradiation condition suitable for recording information on the second or third recording layer 12 or 13 is extracted on the basis of the test result of the first recording layer 11 and the test result of the second or third recording layer 12 or 13. Then, information is recorded on the second or third recording layer 12 or 13 by the use of the extracted irradiation condition. Accordingly, it is possible to reduce the test time for extracting the irradiation condition of the second and third recording layers 12 and 13 and thus to reduce the test time before recording information, thereby reducing recording information for a short time.

In the test recording operation of the second or third recoding layer 12 or 13, since only the test process with a change in pulse width is performed, it is possible to further reduce the test time.

As described above, in the general test recording operation, the characteristic relation between the laser power and $\beta$ is obtained by the laser-power-adjusting test process, the optimum laser power is extracted from the characteristic relation, the characteristic relation between the pulse and the phase shift is obtained by the pulse-width-adjusting test process, and the optimum pulse width, that is, a strategy, is extracted from the characteristic relation. However, in the sixth embodiment, by performing only the pulse-width-adjusting test process to the recording layers other than the first recording layer 11, the number of test recording conditions is decreased to reduce the test time, and then it is possible to extract the strategy having the optimum laser power and the optimum pulse width.

In the above-mentioned embodiment, a well-known multi-layered DVD has been used as the optical disk 10. However, similarly to the first embodiment, even when an HD-DVD or a well-known blue-ray disk is used as the optical disk 10, the same advantages can be obtained by the same processes.

Next, a seventh embodiment will be described.

The apparatus configuration of the seventh embodiment is basically similar to that of the first embodiment, but is different from that of the first embodiment, in that a CPU 125 storing a computer program including a different recording operation to the recording layers 11, 12, and 13 of the optical disk 10 is used in the seventh embodiment. In the following description, the same elements as the first embodiment are denoted by the same reference numerals.

Figure 22:
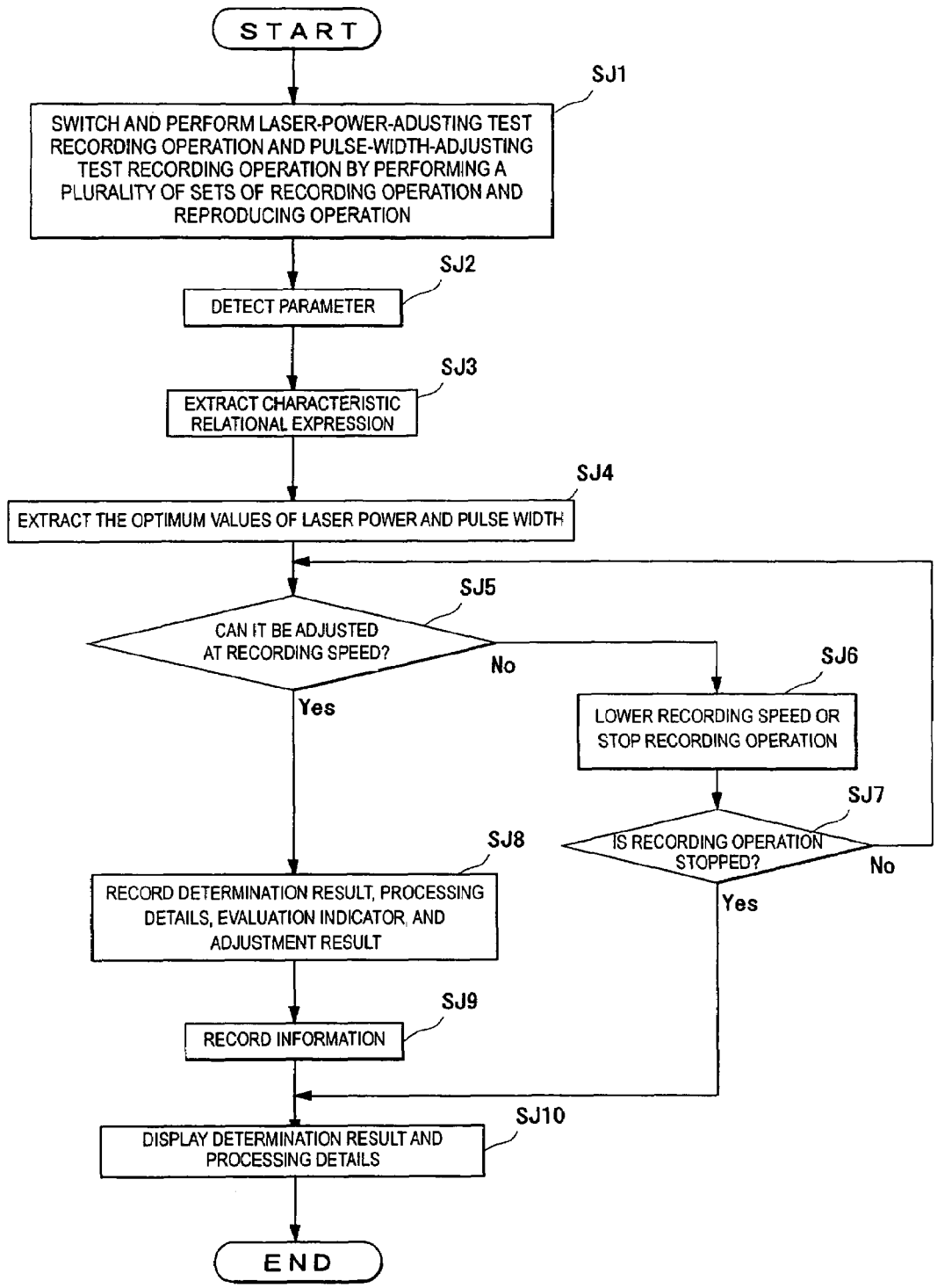
FIG. 22 is a flowchart illustrating a recording operation to a first recording layer according to a seventh embodiment.
Figure 23:
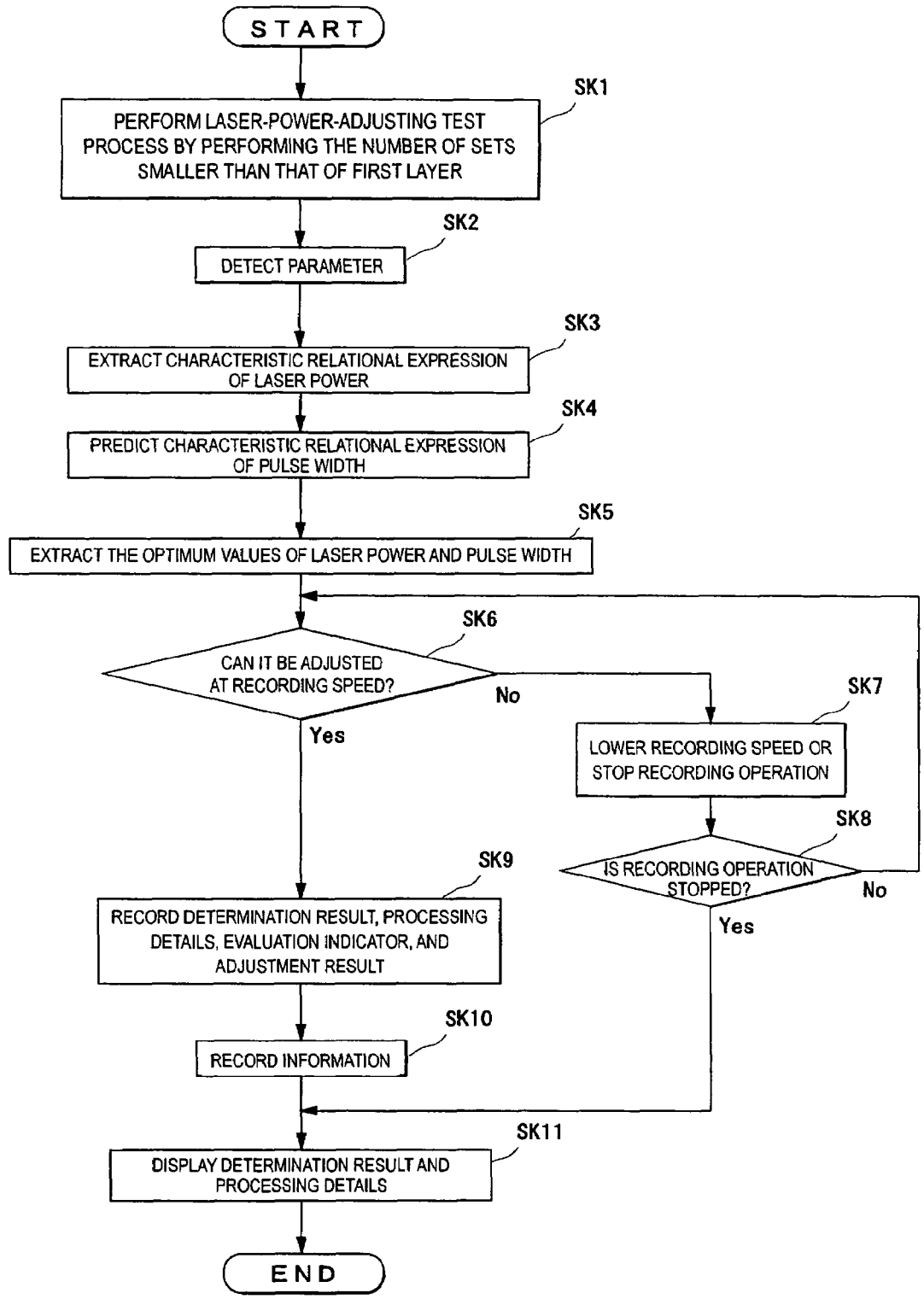
FIG. 23 is a flowchart illustrating a recording operation to a recording layer other than the first recording layer according to the seventh embodiment.

FIGS. 22 and 23 are flowcharts illustrating a recording operation to a recording layer according to the seventh embodiment. A computer program for performing the process is stored in advance in the memory circuit 126 of the CPU 125 and the process is performed by the CPU 125. In the seventh embodiment, the test process at the time of recording data on the first recording layer 11 of the optical disk 10 is almost the same as that of the past, but the test process at the time of recording data on a recording layer other than the first recording layer 11 is different from the test process for the first recording layer 11 so as to reduce the test time.

That is, when recording data on the first recording layer 11, the process shown in the flowchart of FIG. 22 is performed. In the process, by performing a test process using two types of test recording conditions including the laser-power-adjusting test recording operation and the pulse-width-adjusting test recording operation by the use of the same OPC as that in the past, the recorded data are reproduced (SJ1) and parameters (evaluation indicators) of the laser beam irradiating conditions are detected (SJ2). At this time, a set of recording and reproducing operations is switched and performed by a predetermined number of times.

In case of DVD, examples of the parameters can include β (asymmetry), a laser beam irradiating power, and a pulse phase. The laser-power-adjusting test recording operation is performed while gradually varying the laser power Write PW, as shown in FIG. 4, and the pulse-width-adjusting test recording operation is performed while gradually varying the pulse width. When the data of the strategy table stored in the memory unit 127 can be used at the time of detecting the parameters, the data are used, and when the optical disk 10 is an unknown type of optical disk for which the data of the strategy table stored in the memory 127 cannot be used, a well-known automatic strategy detecting process is performed.

Subsequently, a characteristic relational expression is derived from the detected parameters (SJ3). Examples of the characteristic relational expression can include a characteristic relational expression indicating a relation between the laser power Write PW and β, which is shown in the graph of FIG. 5, a characteristic relational expression indicating a phase correcting parameter in a relation between the laser power write PW and the pulse phase, that is, the positional shift of the rising and falling edges of a pulse, which is shown in the graph of FIG. 6, and a characteristic relational expression indicating a pulse phase correcting parameter in a relation between positional shift Pulse (Topr, Tlast) of the rising and falling edges of a pulse and pulse phase, which is shown in the graph of FIG. 7. Here, two kinds of parameters (evaluation parameters), that is, the characteristic relational expression indicating the relation between the laser power Write PW and β, which is shown in the graph of FIG. 5, and the characteristic relational expression indicating the phase correcting parameter in a relation between the laser power Write PW and the pulse phase, which is shown in the graph of FIG. 6, are extracted from the test information recorded with the gradual variation of the laser power.

Thereafter, the optimum values of the laser power and the pulse width are extracted using the parameters obtained from the extracted characteristic relational expressions (SJ4). Then, it is determined whether the optimum values can be applied to recording data with predetermined quality after the optimum values are adjusted at a desired recording speed (SJ5). In the adjustment, at least one of the laser power and the pulse width of the laser beam to be irradiated to the recording layer is adjusted so that a laser-power-adjusting parameter (evaluation indicator) and a pulse-width-adjusting parameter (evaluation indicator) become predetermined values suitable for recording data with predetermined quality with respect to gradual variations in the recording conditions of laser power and pulse width. The OPC may be performed in the adjustment.

When it is determined in SJ5 that the optimum values can be applied, the process of SJ8 to be described later is performed. When it is determined that the optimum values cannot be applied, a predetermined recording speed obtained by lowering the recording speed is set or the recording operation is stopped (SJ6) and then it is determined whether the recording operation is stopped (SJ7). When it is determined that the recording operation is stopped, the process of SJ10 to be described later is performed and when the lowered recording speed is set, the process of SJ5 is performed.

When it is determined in SJ5 that the optimum values can be applied to the desired recording speed, the determination result, the processing details, and information on the parameters (evaluation indicators) and the adjustment result are recorded on the optical disk 10 and are recorded in the memory unit 127 to have a correlation with a medium ID of the optical disk 10 (SJ8). In this way, by leaving the information as a record, the information can be utilized to record data on the same type of optical disk 10. Condition data used for the test recording operation may be recorded to correspond to the information. The information may be recorded in only any one of the optical disk 10 and the memory unit 127. Information on only any one of the determination result and the processing details accompanied with the determination may be recorded, or information on only any one of the parameters (evaluation indicators) and the adjustment result using the parameters may be recorded.

Then, data are recorded on the optical disk 10 by the use of the optimum values (SJ9). Subsequently, the determination result and the processing details are displayed on the display unit 131 (SJ10) and then the data recording operation to the first recording layer 11 is ended. Only any one of the determination result and the processing details accompanied with the determination may be displayed on the display unit 131.

That is, when data are recorded on the recording layers 12 and 13 other than the first recording layer 11, the process shown in the flowchart of FIG. 23 is performed. In the process, a test process using one kind of test recording condition of only the laser-power-adjusting test recording operation is performed by the use of the same OPC as that in the past by the number of sets smaller than the number of sets of the recording and reproducing operations performed to the first recording layer 11, thereby reproducing the recorded data (SK1) and detecting the parameters (evaluation indicators) under the laser beam irradiating condition (SK2). The laser-power-adjusting test recording operation is performed while gradually varying the laser power Write PW as shown in FIG. 4.

Subsequently, a characteristic relational expression is derived from the detected parameters (SK3). For example, the characteristic relational expression indicating a phase correcting parameter in a relation between the laser power Write PW and the pulse phase is derived which is shown in the graph of FIG. 8.

Thereafter, by using the parameter obtained from the derived characteristic relational expression and the characteristic relational expressions extracted for the first recording layer 11, a characteristic relational expression indicating the pulse phase correcting parameter in a relation between the positional shift of a pulse and the pulse phase in other recording layers 12 and 13, that is, the pulse phase correcting parameter in a relation between the positional shift Pulse (Topr, Tlast) of the rising and falling edges of a pulse and the pulse phase, which is shown in the graph of FIG. 9, is predicted (SK4).

Subsequently, the optimum values of the laser power and the pulse width are extracted using the extracted characteristic relational expressions (SK5). Then, it is determined whether the optimum values can be applied to recording data with predetermined quality after the optimum values are adjusted at a desired recording speed (SK6). In the adjustment, at least one of the laser power and the pulse width of the laser beam to be irradiated to the recording layer is adjusted so that a laser-power-adjusting parameter (evaluation indicator) and a pulse-width-adjusting parameter (evaluation indicator) become predetermined values suitable for recording data with predetermined quality with respect to gradual variations in the recording conditions of laser power and pulse width. The OPC may be performed in the adjustment.

When it is determined in SK6 that the optimum values can be applied, the process of SK9 to be described later is performed. When it is determined that the optimum values cannot be applied, a predetermined recording speed obtained by lowering the recording speed is set or the recording operation is stopped (SK7) and then it is determined whether the recording operation is stopped (SK8). When it is determined that the recording operation is stopped, the process of SK11 to be described later is performed and when the lowered recording speed is set, the process of SK6 is performed. When the optimum values cannot be applied even by lowering the recording speed, the process of SK1 and the processes subsequent thereto may be performed again instead of stopping the recording operation.

When it is determined in SK6 that the optimum values can be applied to the desired recording speed, the determination result, the processing details, and information on the parameters (evaluation indicators) and the adjustment result are recorded on the optical disk 10 and are recorded in the memory unit 127 to have a correlation with a medium ID of the optical disk 10 (SK9).

Then, data are recorded on the optical disk 10 by the use of the optimum values (SK10). Subsequently, the determination result and the processing details are displayed on the display unit 131 (SK12) and then the data recording operation to the second or third recording layer 12 or 13 is ended.

According to the embodiment, a set of recording and reproducing the test information with a gradual variation of the recording conditions is performed with respect to the first recording layer 11 by plural times, the irradiation condition suitable for recording information on the first recording layer 11 is extracted on the basis of the obtained test result, the test information is recorded on and reproduced from the other recording layers 12 and 13 other than the first recording layer 11 by the number of sets smaller than the number of sets of the recording and reproducing of the test information in the test process to the first recording layer 11, the irradiation condition suitable for recording information on the second or third recording layer 12 or 13 is extracted on the basis of the test result of the first recording layer 11 and the test result of the second or third recording layer 12 or 13, and then information is recorded on the second or third recording layer 12 or 13 by the use of the extracted irradiation condition. Accordingly, it is possible to reduce the test time for extracting the irradiation condition of the second and third recording layers 12 and 13 and thus to reduce the test time before recording information, thereby recording information for a short time.

In the test recording operation of the second or third recoding layer 12 or 13, since only the test process with a change in laser power is performed but the test process with a change in pulse width which requires much time and a large test area is not performed, it is possible to further reduce the test time.

As described above, in the general test recording operation, the characteristic relation between the laser power and β is obtained by the laser-power-adjusting test process, the optimum laser power is extracted from the characteristic relation, the characteristic relation between the pulse and the phase shift is obtained by the pulse-width-adjusting test process, and the optimum pulse width, that is, a strategy, is extracted from the characteristic relation. However, in the third embodiment, by performing only the laser-power-adjusting test process to the recording layers other than the first recording layer 11 with the decreased number of conditions by the reduced number of sets of the recording and reproducing operations, it is possible to extract the strategy having the optimum laser power and the optimum pulse width.

In the above-mentioned embodiment, a well-known multi-layered DVD has been used as the optical disk 10. However, even when an HD-DVD or a well-known blue-ray disk is used as the optical disk 10, the same advantages can be obtained by the same processes.

Next, an eighth embodiment will be described.

The apparatus configuration of the eighth embodiment is basically similar to that of the first embodiment, but is different from that of the first embodiment, in that a CPU 125 storing a computer program in which a recording operation to the recording layers 12 and 13 other than the first recording layer 11 is partially different from that of the seventh embodiment is used in the eighth embodiment. In the following description, the same elements as the first embodiment are denoted by the same reference numerals.

Figure 24:
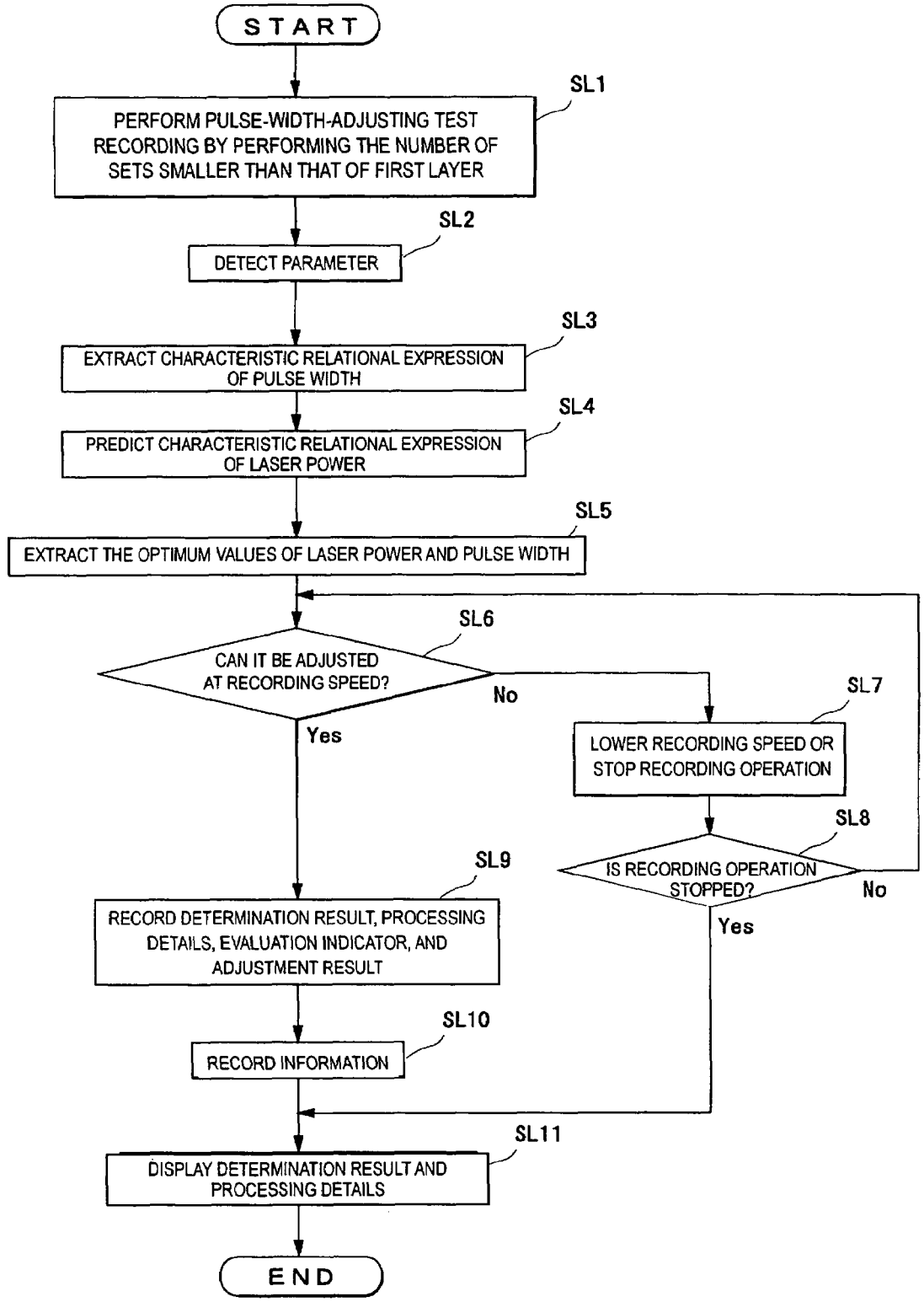
FIG. 24 is a flowchart illustrating a recording operation to a recording layer other than a first recording layer according to an eighth embodiment.

That is, in the optical recording apparatus 100 according to the eighth embodiment, the process of recording information on the first recording layer 11 of the optical disk 10 is similar to that of the seventh embodiment shown in the flowchart of FIG. 22. In the process of recording information on the recording layers 12 and 13 other than the first recording layer 11, as shown in the flowchart of FIG. 24, a test process using one kind of test recording condition of only the pulse-width-adjusting test recording operation is performed by the use of the same OPC as that in the past by the number of sets smaller than the number of sets of the recoding and reproducing operations for the first recording layer 11, thereby reproducing the recorded data (SL1) and detecting the parameters (evaluation indicators) under the laser beam irradiating condition (SL2). The pulse-width-adjusting test recording operation is performed while gradually varying the pulse width.

Subsequently, a characteristic relational expression is derived from the detected parameters (SL3). For example, the characteristic relational expression indicating a pulse phase correcting parameter in a relation between the positional shift Pulse (Topr, Tlast) of the rising and falling edges of a pulse and the pulse phase is derived which is shown in the graph of FIG. 9.

Thereafter, by using the derived characteristic relational expression and the characteristic relational expressions extracted for the first recording layer 11, a characteristic relational expression indicating the pulse phase correcting parameter in a relation between the laser power and the pulse phase in the other recording layers 12 and 13, that is, the phase correcting parameter in a relation between the laser power Write PW and the pulse phase, which is shown in the graph of FIG. 8, is predicted (SL4).

Subsequently, the optimum values of the laser power and the pulse width are extracted using the extracted characteristic relational expression (SL5). Then, it is determined whether the optimum values can be applied to recording data with predetermined quality after the optimum values are adjusted at a desired recording speed (SL6). In the adjustment, at least one of the laser power and the pulse width of the laser beam to be irradiated to the recording layer is adjusted so that the laser-power-adjusting parameter (evaluation indicator) and the pulse-width-adjusting parameter (evaluation indicator) become predetermined values suitable for recording data with predetermined quality with gradual variations in the recording conditions of laser power and pulse width. The OPC may be performed in the adjustment.

When it is determined in SL6 that the optimum values can be applied, the process of SL9 to be described later is performed. When it is determined that the optimum values cannot be applied, a predetermined recording speed obtained by lowering the recording speed is set or the recording operation is stopped (SL7) and then it is determined whether the recording operation is stopped (SL8). When it is determined that the recording operation is stopped, the process of SL11 to be described later is performed and when the lowered recording speed is set, the process of SL6 is performed. When the optimum values cannot be applied even by lowering the recording speed, the process of SL1 and the processes subsequent thereto may be performed again instead of stopping the recording operation.

When it is determined in SL6 that the optimum values can be applied to the desired recording speed, the determination result, the processing details, and information on the parameters (evaluation indicators) and the adjustment result are recorded on the optical disk 10 and are recorded in the memory unit 127 to have a correlation with a medium ID of the optical disk 10 (SL9). In this way, by leaving the information as a record, the information can be utilized to record data on the same type of optical disk 10. Condition data used for the test recording operation may be recorded to correspond to the information. The information may be recorded in only any one of the optical disk 10 and the memory unit 127. Information on only any one of the determination result and the processing details accompanied with the determination may be recorded, or information on only any one of the parameters (evaluation indicators) and the adjustment result using the parameters may be recorded.

Then, data are recorded on the optical disk 10 by the use of the optimum values (SL10). Subsequently, the determination result and the processing details are displayed on the display unit 131 (SL12) and then the data recording operation to the second or third recording layer 12 or 13 is ended. Only any one of the determination result and the processing details accompanied with the determination may be displayed on the display unit 131.

According to the embodiment, a set of recording and reproducing the test information with a gradual variation of the recording conditions is performed with respect to the first recording layer 11 by plural times, the irradiation condition suitable for recording information on the first recording layer 11 is extracted on the basis of the obtained test result, the test information is recorded on and reproduced from the other recording layers 12 and 13 other than the first recording layer 11 by the number of sets smaller than the number of sets of the recording and reproducing of the test information in the test process to the first recording layer 11, the irradiation condition suitable for recording information on the second or third recording layer 12 or 13 is extracted on the basis of the test result of the first recording layer 11 and the test result of the second or third recording layer 12 or 13, and then information is recorded on the second or third recording layer 12 or 13 by the use of the extracted irradiation condition. Accordingly, it is possible to reduce the test time for extracting the irradiation condition of the second and third recording layers 12 and 13 and thus to reduce the test time before recording information, thereby recording information for a short time.

In the test recording operation to the second or third recoding layer 12 or 13, since only the test process with a change in pulse width is performed, it is possible to further reduce the test time.

As described above, in the general test recording operation, the characteristic relation between the laser power and $\beta$ is obtained by the laser-power-adjusting test process, the optimum laser power is extracted from the characteristic relation, the characteristic relation between the pulse and the phase shift is obtained by the pulse-width-adjusting test process, and the optimum pulse width, that is, a strategy, is extracted from the characteristic relation. However, in the eighth embodiment, by performing only the pulse-width-adjusting test process to the recording layers other than the first recording layer 11, the number of test recording conditions is decreased to reduce the test time, and then it is possible to extract the strategy having the optimum laser power and the optimum pulse width.

In the above-mentioned embodiment, a well-known multi-layered DVD has been used as the optical disk 10. However, similarly to the first embodiment, even when an HD-DVD or a well-known blue-ray disk is used as the optical disk 10, the same advantages can be obtained by the same processes.

The above-mentioned embodiments are only specific examples of certain inventive aspects and thus these inventive aspects are not limited to the configurations of the embodiments. For example, in the embodiments, the adjustment process is performed after acquiring the optimum values, but the adjustment process may be omitted if only it is not necessary to perform the adjustment process. The process of lowering the recording speed or stopping the recording operation, the process of displaying the determination results or the like, and the process of recording the information may be performed as needed.

In the embodiments, the optimum value of the laser beam irradiated to the other recording layers 12 and 13 has been obtained for a short time with reference to the first recording layer 11, but the optimum value of the laser beam irradiated to the other recording layers may be obtained for a short time with reference to a recording layer other than the first recording layer. In the embodiments, the information recording operation has been sequentially performed in the order from the first recording layer 11 away from the laser beam irradiating surface to the third recording layer 13 close to the laser beam irradiating surface. However, the inventive aspect is not limited to that order, but the information recording operation may be performed from a recording layer other than the first recording layer 11.

Another embodiment will be described.

Figure 27:
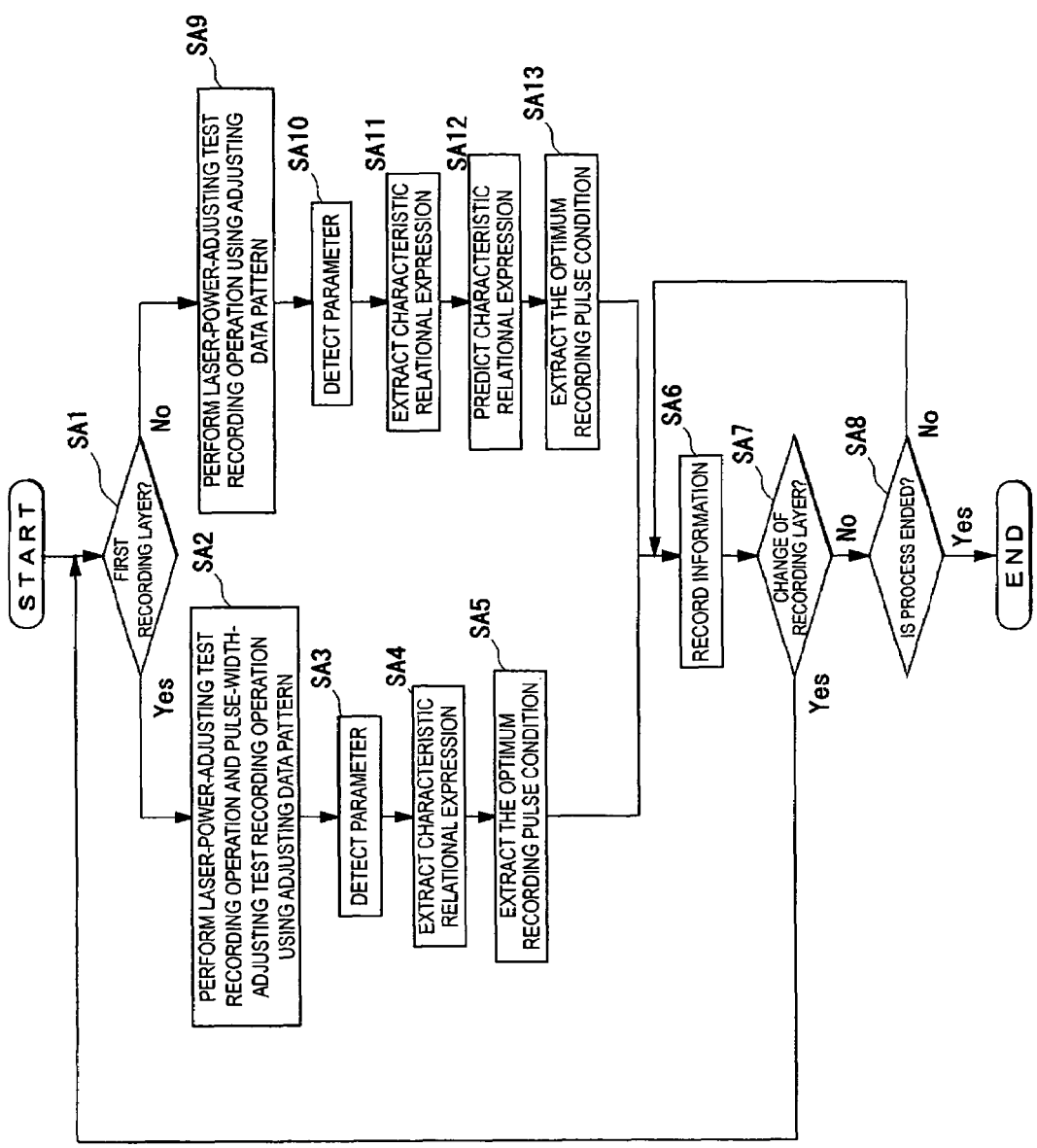
FIG. 27 is a flowchart illustrating a recording operation to a first recording layer according to a first modified embodiment.

FIG. 27 is a flowchart illustrating a recording operation to a recording layer according to a first modified embodiment. A computer program for performing the process is stored in advance in the memory circuit 126 of the CPU 125 and the process is performed by the CPU 125. In the first modified embodiment, the test process at the time of recording data on the first recording layer of the optical disk 10 is almost similar to that in the past, but in the test process at the time of recording data on a recording layer other than the first recording layer 11, it is possible to save the test time, unlike the test process to the first recording layer 11.

Figure 28:
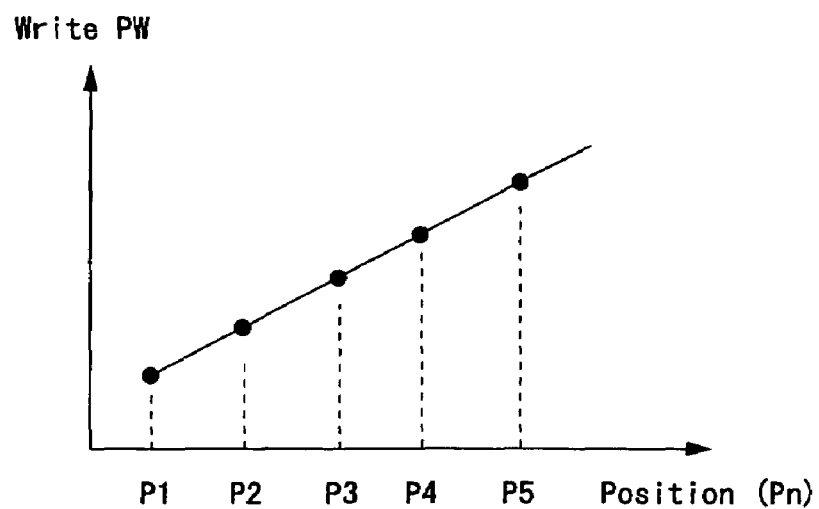
FIG. 28 is a diagram illustrating a gradual variation in laser power in a laser-power-adjusting test recording operation.

That is, when recording data on the first recording layer 11, the process shown in FIG. 27 is performed. At the initial time, it is determined whether the recording operation is directed to the first recording layer 11 of the optical disk 10 (SA1). When the information recording operation is performed to a recording layer other than the first recording layer 11, the process proceeds to SA9 to be described later, and when the recording operation is directed to the first recording layer 11, by performing a predetermined number of times the test process including the laser-power-adjusting test recording operation and the pulse-width-adjusting test recording operation with an adjusting data pattern by the use of the same optimum power control (hereinafter, referred to as OPC) of a recording laser beam as that in the past, recorded data are reproduced (SA2) and the parameters (characteristic values) of the laser beam irradiating conditions are detected (SA3). In case of DVD, examples of the parameters can include β (asymmetry), a laser beam irradiating power, and a pulse phase. The laser-power-adjusting test recording operation is performed with a gradual variation of the laser power Write PW as shown in FIG. 28, and the pulse-width-adjusting test recording operation is performed with a gradual variation of the pulse width. When the data of the strategy table stored in the memory unit 127 can be used at the time of detecting the parameter, the data are used, and when the optical disk 10 is an unknown type of optical disk for which the data of the strategy table stored in the memory 127 cannot be used, a well-known automatic strategy detecting operation is performed.

Figure 29:
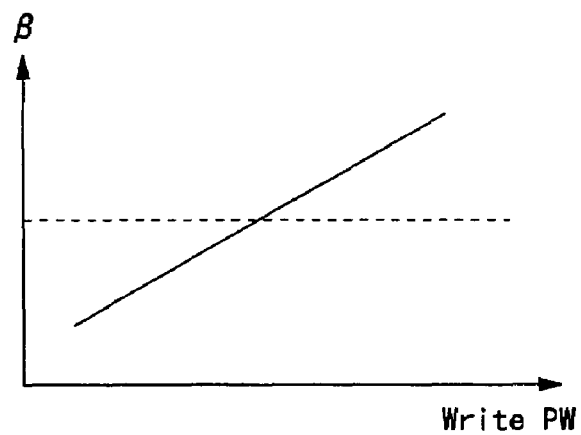
FIG. 29 is a diagram illustrating a characteristic relational expression expressing a relation between laser power and β.
Figure 30:
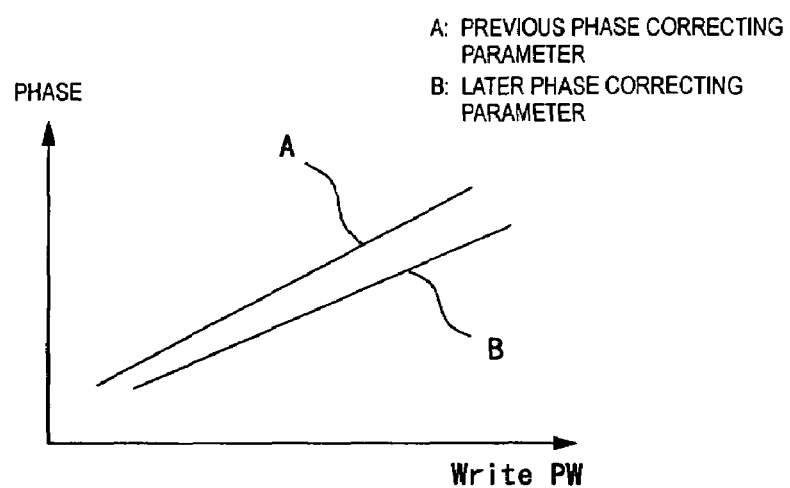
FIG. 30 is a diagram illustrating a characteristic relational expression indicating a relation between laser power and pulse phase.
Figure 31:
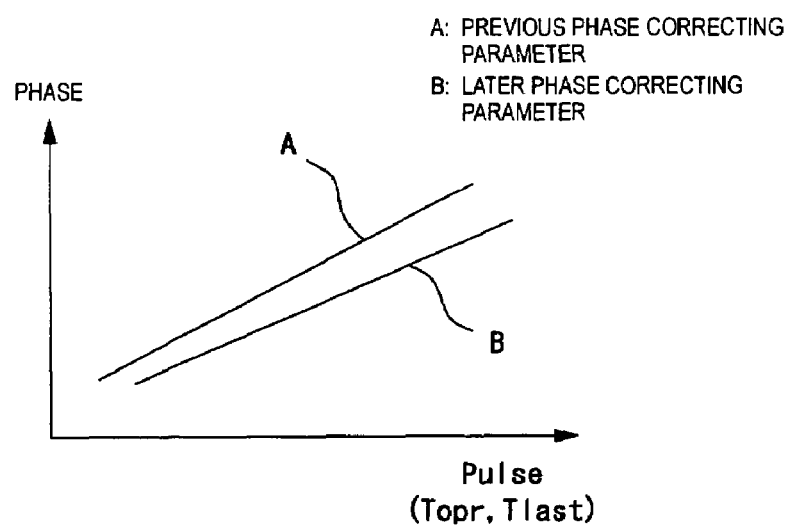
FIG. 31 is a diagram illustrating a characteristic relational expression indicating a pulse phase correcting parameter in a relation between positional shift of the rising and falling edges of a pulse and pulse phase.

Subsequently, a characteristic relational expression is derived from the detected parameters (SA4). Examples of the characteristic relational expression can include a characteristic relational expression indicating a relation between the laser power Write PW and β, which is shown in the graph of FIG. 29, a characteristic relational expression indicating a phase correcting parameter in a relation between the laser power write PW and the pulse phase, which is shown in the graph of FIG. 30, and a characteristic relational expression indicating a pulse phase correcting parameter in a relation between positional shift Pulse (Topr, Tlast) of the rising and falling edges of a pulse and pulse phase, which is shown in the graph of FIG. 31. Here, two kinds of parameters, that is, the characteristic relational expression indicating the relation between the laser power Write PW and β, which is shown in the graph of FIG. 29, and the characteristic relational expression indicating the phase correcting parameter in a relation between the laser power Write PW and the pulse phase, which is shown in the graph of FIG. 30, are extracted from the test information recorded with the gradual variation of the laser power.

Thereafter, the optimum recording pulse condition of the laser power and the pulse width is extracted using the parameters obtained from the extracted characteristic relational expressions (SA5). Then, information is actually recorded on the first recording layer 11 by the use of the optimum recording pulse condition (SA6).

Subsequently, it is determined whether the change of the recording layer is required in the course of recording information (SA7). When the change of the recording layer is required, the process of SA1 is performed and when the change of the recording layer is not required, it is determined whether the information recording operation has been ended (SA8). When it is determined that the information recording operation has not been ended, the process of SA6 is performed and when it is determined that the information recording operation has been ended, the process is ended.

On the other hand, when it is determined in SA1 that the information recording operation is performed to a recording layer other than the first recording layer 11, the test process including only the laser-power-adjusting test recording operation is performed with the same adjusting data pattern as used in the test process of the first recording layer 11 by the use of the same OPC as that in the past by the number of times smaller than the number of times for the first recording layer 11, thereby reproducing recorded data (SA9) and detecting the parameters (characteristic values) of the laser beam irradiating conditions are detected (SA10). The laser-power-adjusting test recording operation is performed with a gradual variation in laser power Write PW as shown in FIG. 28.

Figure 32:
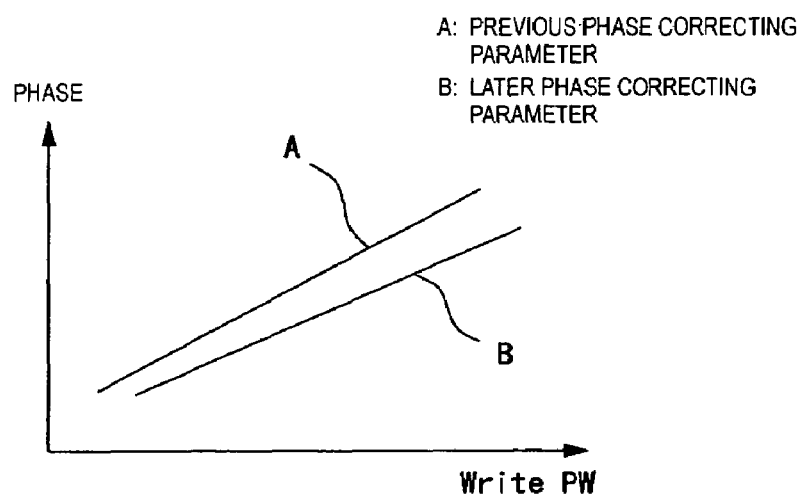
FIG. 32 is a diagram illustrating a characteristic relational expression indicating a phase correcting parameter in a relation between laser power and pulse phase.

Subsequently, a characteristic relational expression is derived from the detected parameters (SA11). For example, the characteristic relational expression indicating a phase correcting parameter in a relation between the laser power Write PW and the pulse phase is derived which is shown in the graph of FIG. 32. In this way, when it is intended to record information on the second recording layer 12, only the characteristic relational expression different from those of the first recording layer 11 is derived, thereby reducing the test time.

Figure 33:
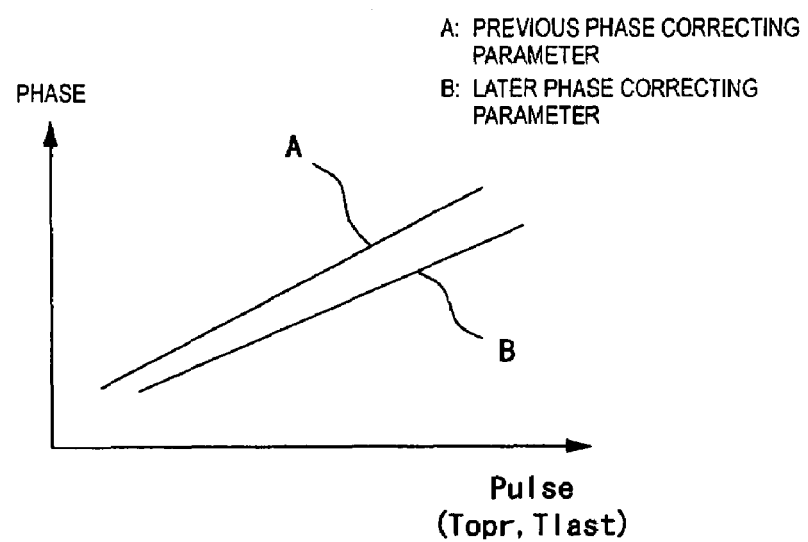
FIG. 33 is a diagram illustrating a characteristic relational expression indicating a pulse phase correcting parameter in a relation between positional shift of the rising and falling edges of a pulse and pulse phase.

Thereafter, by using the parameters obtained from the derived characteristic relational expression and the characteristic relational expressions extracted for the first recording layer 11, a characteristic relational expression indicating the pulse phase correcting parameter in a relation between the positional shift of a pulse and the pulse phase in other recording layers 12, that is, the pulse phase correcting parameter in a relation between the positional shift Pulse (Topr, Tlast) of the rising and falling edges of a pulse and the pulse phase, which is shown in the graph of FIG. 33, is predicted (SA12).

Subsequently, the optimum recording pulse conditions of the laser power and the pulse width are extracted using the derived characteristic relational expressions (SA13). Thereafter, information is recorded on the optical disk 10 by the use of the optimum recording pulse conditions (SA6).

Then, it is determined whether the change of the recording layer is required in the course of recording information (SA7). When the change of the recording layer is required, the process of SA1 is performed and when the change of the recording layer is not required, it is determined whether the information recording operation has been ended (SA8). When it is determined that the information recording operation has not been ended, the process of SA6 is performed and when it is determined that the information recording operation has been ended, the process is ended.

According to the above-mentioned embodiment, the recording pulse condition suitable for the first recording layer 11 is extracted for a predetermined test time by performing the test recording operation to the first recording layer 11 before actually recording data, and the recording pulse condition for the second recording layer is extracted for a time shorter than the test time for the first recording layer 11 by performing only the test process with the variation in laser power to the second recording layer 12, but not performing the test process with variation in pulse width which uses much time and a large test area. Accordingly, it is possible to reduce the test time for extracting the recording pulse condition of the second recording layer 12 and to reduce the test time before recording data, thereby recording data for a short time.

While the above detailed description has shown, described, and pointed out novel features of the invention as applied to various embodiments, it will be understood that various omissions, substitutions, and changes in the form and details of the device or process illustrated may be made by those skilled in the technology without departing from the spirit of the invention. The scope of the invention is indicated by the appended claims rather than by the foregoing description. All changes which come within the meaning and range of equivalency of the claims are to be embraced within their scope.

What is claimed is:

1. An optical recording method in which an optical recording apparatus records information on a recording medium having a plurality of layers comprising at least one recording layer and another recording layer by irradiating a laser beam to the recording medium, the optical recording apparatus extracts an irradiation condition of the laser beam by recording and reproducing test information with respect to a test area of the recording layers and records the information on the recording medium by irradiating the laser beam to the recording medium by the use of the extracted irradiation condition, the method comprising: recording and reproducing the test information with respect to the one recording layer with a gradual variation in recording condition of laser power and a gradual variation in recording condition of pulse-width; extracting the irradiation condition suitable for recording information on the one recording layer on the basis of a test result of a reference recording layer testing step; recording and reproducing the test information with respect to the another recording layer with the gradual variation in recording condition; wherein only one of the laser power and the pulse-width are varied; and extracting the irradiation condition suitable for recording information on the another recording layer on the basis of the test result of the reference recording layer testing step and a test result of an another recording layer testing step.

2. The optical recording method according to claim 1, comprising:
   recording and reproducing the test information with respect to the one recording layer with the gradual variation in recording condition of laser power and the gradual variation in recording condition of pulse-width;
   extracting the irradiation condition suitable for recording information on the one recording layer on the basis of the test result of the reference recording layer testing step;
   recording and reproducing the test information with respect to the another recording layer by the use of the gradual variation in recording condition of the laser power; and
   extracting the irradiation condition of the pulse-width suitable for recording information on the another recording layer on the basis of the test result of the reference recording layer testing step and the test result of the another recording layer testing step.

3. The optical recording method according to claim 1, comprising:
   recording and reproducing the test information with respect to the one recording layer with the gradual variation in recording condition of laser power and the gradual variation in recording condition of pulse-width using a first number of conditions;
   extracting the irradiation condition suitable for recording information on the one recording layer on the basis of the test result of the reference recording layer testing step;
   recording and reproducing the test information with respect to the another recording layer with either the gradual variation in recording condition of the laser power or the gradual variation in recording condition of the pulse width using a number of conditions smaller than the first number of test recording conditions used in the reference recording layer testing step; and
   extracting the irradiation condition of whichever of the laser power and the pulse-width was not varied suitable for recording information on the another recording layer on the basis of the test result of the reference recording layer testing step and the test result of the another recording layer testing step.

4. The optical recording method according to claim 1, wherein the reference recording layer testing step further comprises: a first test information recording step for recording the test information on the one recording layer with the gradual variation in recording condition of laser power and the gradual variation in recording condition of pulse-width; and a first information reproducing step for reproducing the test information recorded in the first test information recording step, wherein the another recording layer testing step further comprises: a second test information recording step for recording the test information on the another recording layer with either the gradual variation in recording condition of laser power or the gradual variation in recording condition of pulse-width; and a second test information reproducing step for reproducing the test information recorded in the second test information recording step, and wherein a number of times when the second test information recording step and the second test information reproducing step are switched is set smaller than a number of times when the first test information recording step and the first test information reproducing step are switched.

5. The optical recording method according to claim 1, comprising:
   performing plural limes a set of recording and reproducing the test information with respect to the one recording layer, the set comprising a gradual variation in recording condition of the laser power and the pulse-width;
   extracting the irradiation condition suitable for recording information on the one recording layer on the basis of the test result of the reference recording layer testing step;
   recording and reproducing the test information with respect to the another recording layer with either the gradual variation in recording condition of laser power or the gradual variation in recording condition of pulse-width by a number of times smaller than the number of times when the set of recording and reproducing the test information is performed in the reference recording layer testing step; and
   extracting the irradiation condition of whichever of the laser power and the pulse width was not varied suitable for recording information on the another recording layer on the basis of the test result of the reference recording layer testing step and the test result of the another recording layer testing step.

6. The optical recording method according to claim 1, wherein in the reference recording layer testing step, both of the recording and reproducing of the test information with a gradual variation in recording condition of a laser power and the recording and reproducing of the test information with a gradual variation in recording condition of a pulse width are performed to the one recording layer,
   wherein in the another recording layer testing step, the recording and reproducing of the test information with a gradual variation in recording condition of a laser power is performed to the another recording layer,
   wherein in the another-recording-layer irradiation condition extracting step, a pulse-width-adjusting evaluation indicator with the gradual variation in recording condition of a pulse width in the another recording layer is extracted from a laser-power-adjusting evaluation indicator and a pulse-width-adjusting evaluation indicator with the gradual variations in recording conditions of the laser power and the pulse width obtained in the reference recording layer testing step and a laser-power-adjusting evaluation indicator with the gradual variation in recording condition of the laser power obtained in the another recording layer testing step, and wherein the method comprises adjusting at least one of the laser power and the pulse width of the laser beam to be irradiated to the another recording layer so that the laser-power-adjusting evaluation indicator and the pulse-width-adjusting evaluation indicator with the gradual variation in recording condition of the laser power and the pulse width for the another recording layer become predetermined values suitable for recording information.

7. The optical recording method according to claim 1, wherein in the reference recording layer testing step, both of the recording and reproducing of the test information with a gradual variation in recording condition of a laser power and the recording and reproducing of the test information with a gradual variation in recording condition of a pulse width are performed to the one recording layer, wherein in the another recording layer testing step, the recording and reproducing of the test information with a gradual variation in recording condition of a pulse width is performed to the another recording layer, wherein in the another-recording-layer irradiation condition extracting step, a laser-power-adjusting evaluation indicator with the gradual variation in recording condition of a laser power is extracted from a laser-power-adjusting evaluation indicator and a pulse-width-adjusting evaluation indicator with the gradual variations in recording conditions of the laser power and the pulse width, which are obtained in the reference recording layer testing step, and a pulse-width-adjusting evaluation indicator with the gradual variation in recording condition of the pulse width, which is obtained in the another recording layer testing step, and wherein the method comprises adjusting at least one of the laser power and the pulse width of the laser beam to be irradiated to the another recording layer so that the laser-power-adjusting evaluation indicator and the pulse-width-adjusting evaluation indicator with the gradual variation in recording conditions of the laser power and the pulse width for the another recording layer become predetermined values suitable for recording information.

8. The optical recording method according to claim 6, the method comprises determining that the another recording layer is recordable when data can be recorded at a predetermined recording speed with predetermined quality by means of the adjustment in the adjustment step and determining that the another recording layer is non-recordable when data cannot be recorded with predetermined quality by means of the adjustment in the adjustment step.

9. The optical recording method according to claim 8, the method comprises performing an actual recording operation at the predetermined recording speed when it is determined in the determination step that data can be recorded at the predetermined recording speed and performing the recording operation at a recording speed lower than the predetermined recording speed or stopping the recording operation when it is determined in the determination step that data cannot be recorded at the predetermined recording speed.

10. The optical recording method according to claim 8, the method comprises performing an actual recording operation at the predetermined recording speed when it is determined in the determination step that data can be recorded at the predetermined recording speed and performs again the another recording layer testing step when it is determined in the determination step that data cannot be recorded at the predetermined recording speed.

11. The optical recording method according to claim 8, the method comprises displaying at least one of the determination result of the determination step and the processing details based on the determination result.

12. The optical recording method according to claim 8, the method comprises recording at least one of the determination result of the determination step and the processing details based on the determination result on at least one of a recording medium having been subjected to a test recording operation and the optical recording apparatus having performed the test recording operation.

13. The optical recording method according to claim 8, the method comprises recording at least one of the determination result of the determination step, the evaluation indicator extracted in the another-recording-layer irradiation condition extracting step, and data indicating the adjustment result of the adjustment step on at least one of a recording medium having been subjected to the test recording operation and the optical recording apparatus having performed the test recording operation.

14. The optical recording method according to claim 13, wherein one of the evaluation indicator and data indicating the adjustment result comprises data relating to the test recording condition.

15. An evaluation indicator acquiring method in an optical recording method in which when an optical recording apparatus records information on a recording medium having a plurality of layers comprising one recording layer and another recording layer by irradiating a laser beam to the recording medium, the optical recording apparatus acquires an evaluation indicator for determining an irradiation condition of the laser beam by recording test information in a test area of the recording layers and then reproducing the recorded test information and adjusts the irradiation condition of the laser beam by the use of the acquired evaluation indicator, the method comprises:

recording the test information on the one recording layer with a gradual variation in recording condition of a laser power;

acquiring a variation of a pulse-width-adjusting evaluation indicator comprising at least one of a phase deviation, a length deviation, and an amplitude deviation of a pulse with the variation in recording condition of the laser power when reproducing the test information recorded in the test information recording step;

acquiring a correlation of the acquired variation of the pulse-width-adjusting evaluation indicator with the variation of the laser power;

recording the test information on the another recording layer with the gradual variation in recording condition of the laser power;

calculating a relation of the variation of the pulse-width-adjusting evaluation indicator with the variation of the laser power in the another recording layer by applying the result of the second test recording step to the correlation; and acquiring a pulse-width-adjusting evaluation indicator for determining the pulse width condition which corresponds to a suitable laser power recording condition in the another recording layer by the use of the relation calculated in the calculation step.

16. The evaluation indicator acquiring method according to claim 15, the method comprises:
recording the lest information on the one recording layer with a gradual variation in recording condition of a pulse width;
acquiring a laser-power-adjusting evaluation indicator with the variation in recording condition of the pulse width when reproducing the test information recorded on the one recording layer in the test information recording step;
acquiring a correlation of the variation of the laser-power-adjusting evaluation indicator with the variation of the pulse width;
recording the test information on the another recording layer with the gradual variation in recording condition of the pulse width;
calculating a relation of the variation of the laser-power-adjusting evaluation indicator with the variation in recording condition of the pulse width in the another recording layer by applying the result of the second test recording step to the correlation; and
acquiring a laser-power-adjusting evaluation indicator for determining the laser power condition in the another recording layer by the use of the relation calculated in the calculation step.

17. The evaluation indicator acquiring method according to claim 15, the method comprises:
recording test recording information and/or user data recording information on the recording layers; and
reproducing the information recorded in the information recording step and acquiring plural kinds of evaluation indicators of the irradiation conditions of the laser beam from the reproduced information.

18. The evaluation indicator acquiring method according to claim 17, wherein the plural kinds of evaluation indicators comprise at least one of a laser-power-adjusting evaluation indicator and the pulse-width-adjusting evaluation indicator.

19. An optical recording apparatus which, when recording information on a recording medium having a plurality of layers comprising one recording layer and another recording layer by irradiating a laser beam to the recording medium, extracts an irradiation condition of the laser beam by recording and reproducing test information with respect to a test area of the recording layers and records the information on the recording medium by irradiating the laser beam to the recording medium by the use of the extracted irradiation condition, the optical recording apparatus comprising:
a reference recording layer testing unit configured to record and reproduce the test information with respect to the one recording layer with a gradual variation in recording condition of laser power and a gradual variation in recording condition of pulse-width;
a reference-recording-layer irradiation condition extracting unit configured to extract the irradiation condition suitable for recording information on the one recording layer on the basis of the test result obtained by the reference recording layer testing unit;
an another recording layer testing unit configured to record and reproduce the test information with respect to the another recording layer with the gradual variation in recording condition; wherein the another recording layer testing unit is configured to vary only one of the laser power and the pulse-width; and
an another-recording-layer irradiation condition extracting unit configured to extract the irradiation condition of whichever of the laser power and the pulse-width is not varied suitable for recording information on the another recording layer on the basis of the test result obtained by the reference recording layer testing unit and the test result obtained by the another recording layer testing unit.

20. The optical recording apparatus according to claim 19, the optical recording apparatus comprises:
a reference recording layer testing unit configured to record and reproduce the test information with respect to the one recording layer with the gradual variation in recording condition of laser power and the gradual variation in recording condition of pulse-width;
a reference-recording-layer irradiation condition extracting unit configured to extract the irradiation condition suitable for recording information on the one recording layer on the basis of the test result obtained by the reference recording layer testing unit;
an another recording layer testing unit configured to record and reproduce the test information with respect to the another recording layer by the use of the gradual variation in recording condition of the laser power performed by the reference recording layer testing unit; and
an another-recording-layer irradiation condition extracting unit configured to extract the irradiation condition of the pulse-width suitable for recording information on the another recording layer on the basis of the test result obtained by the reference recording layer testing unit and the test result obtained by the another recording layer testing unit.

21. The optical recording apparatus according to claim 19, wherein the optical recording apparatus comprises:
a reference recording layer testing unit configured to record and reproduce the test information with respect to the one recording layer by the use the gradual variation in recording condition of laser power and the gradual variation in recording condition of pulse-width using a first number of conditions;
a reference-recording-layer irradiation condition extracting unit configured to extract the irradiation condition suitable for recording information on the one recording layer on the basis of the test result obtained by the reference recording layer testing unit;
an another recording layer testing unit configured to record and reproduce the test information with respect to the another recording layer with either the gradual variation in recording condition of the laser power or the gradual variation in recording condition of the pulse width using a number of conditions smaller than the first number of test recording conditions used in the reference recording layer testing unit; and
an another-recording-layer irradiation condition extracting unit configured to extract the irradiation condition of whichever of the laser power and the pulse-width was not varied suitable for recording information on the another recording layer on the basis of the test result obtained by the reference recording layer testing unit and the test result obtained by the another recording layer testing unit.

22. The optical recording apparatus according to claim 19, wherein the optical recording apparatus comprises: a first test information recording unit configured to record the test information on the one recording layer with the gradual variation in recording condition of laser power and the gradual variation in recording condition of pulse-width; a first test information reproducing unit configured to reproduce the test information recorded by the first test information recording unit; a reference-recording-layer irradiation condition extracting unit configured to extract the irradiation condition suitable for recording information on the one recording layer on the basis of the test result obtained by the reference recording layer testing unit; a second test information recording unit configured to record the test information on the another recording layer with either the gradual variation in recording condition of the laser power or the gradual variation in recording condition of the pulse width: a second test information reproducing unit configured to reproduce the test information recorded by the second test information recording unit; a switching unit configured to switch the recording and reproducing of the test information by a number of times, when the recording of the test information performed by the second test information recording unit and the reproducing of the test information performed by the second test information reproducing unit are switched, set smaller than a number of times, when the recording of the test information performed by the first test information recording unit and the reproducing of the test information performed by the first test information reproducing unit are switched; and an another-recording-layer irradiation condition extracting unit configured to extract the irradiation condition of whichever of the laser power and the pulse-width was not varied suitable for recording information on the another recording layer on the basis of the test result obtained by the reference recording layer testing unit and the test result obtained by the another recording layer testing unit.

23. The optical recording apparatus according to claim 19, wherein the optical recording apparatus comprises: a reference recording layer testing unit configured to perform plural times a set of recording and reproducing the test information with respect to the one recording layer, the set comprising a gradual variation in recording condition of the laser power and the pulse-width; a reference-recording-layer irradiation condition extracting unit configured to extract the irradiation condition suitable for recording information on the one recording layer on the basis of the test result obtained by the reference recording layer testing unit; an another recording layer testing unit configured to record and reproduce the test information with respect to the another recording layer with either the gradual variation in recording condition of laser power or the gradual variation in recording condition of pulse-width by the a number of times smaller than the number of times when the set of recording and reproducing the test information is performed by the reference recording layer testing unit; and an another-recording-layer irradiation condition extracting unit configured to extract the irradiation condition of whichever of the laser power and the pulse width was not varied suitable for recording information on the another recording layer on the basis of the test result obtained by the reference recording layer testing unit and the test result obtained by the another recording layer testing unit.

24. The optical recording apparatus according to claim 19, wherein the optical recording apparatus comprises:
a test information recording unit configured to record the test information on the one recording layer with a gradual variation in recording condition of a laser power;
an acquisition unit configured to acquire a variation of a pulse-width-adjusting evaluation indicator comprising at least one of a phase deviation, a length deviation, and an amplitude deviation of a pulse with the variation in recording condition of the laser power when reproducing the test information recorded by the test information recording unit;
a correlation acquiring unit configured to acquire a correlation of the acquired variation of the pulse-width-adjusting evaluation indicator with the variation of the laser power;
a second test information recording unit configured to record the test information on the another recording layer with the gradual variation in recording condition of the laser power;
a calculation unit configured to calculate a relation of the variation of the pulse-width-adjusting evaluation indicator with the variation of the pulse width in the another recording layer by applying the result obtained the second test recording unit to the correlation obtained by the correlation acquiring unit; and
a pulse-width-adjusting evaluation indicator acquiring unit configured to acquire a pulse-width-adjusting evaluation indicator for determining the pulse width condition in the another recording layer by the use of the relation calculated by the calculation unit.

25. The optical recording apparatus according to claim 19, wherein the optical recording apparatus comprises:
a test information recording unit configured to record the test information on the one recording layer with a gradual variation in recording condition of a pulse width;
a laser-power-adjusting evaluation indicator acquiring unit configured to acquire a laser-power-adjusting evaluation indicator with the variation in recording condition of the pulse width when reproducing the test information recorded on the one recording layer by the test information recording unit;
a correlation acquiring unit configured to acquire a correlation of the variation of the laser-power-adjusting evaluation indicator with the variation of the pulse width;
a second test information recording unit configured to record the test information on the another recording layer with the gradual variation in recording condition of the pulse width; and
a calculation unit configured to calculate the laser-power-adjusting evaluation indicator with respect to the variation in recording condition of the pulse width in the another recording layer by applying the result obtained by the second test recording unit to the correlation.

26. A central processor unit (CPU) device used for an optical recording apparatus which, when recording information on a recording medium having a plurality of layers comprising one recording layer and another recording layer by irradiating a laser beam to the recording medium, extracts an irradiation condition of the laser beam by recording and reproducing test information with respect to a test area of the recording layers and records the information on the recording medium by irradiating the laser beam to the recording medium by the use of the extracted irradiation condition, the CPU device comprising a memory circuit storing a computer program for performing a method, the method comprising:
recording and reproducing the test information with respect to the one recording layer with a gradual variation in recording condition of laser power and a gradual variation in recording condition of pulse-width; extracting the irradiation condition suitable for recording information on the one recording layer on the basis of a test result of a reference recording layer testing step; recording and reproducing the test information with respect to the another recording layer with the gradual variation in recording condition; wherein only one of the laser power and the pulse-width are varied; and extracting the irradiation condition of whichever of the laser power and the pulse-width was not varied during the recording of the test information with respect to the another recording layer suitable for recording information on the another recording layer on the basis of the test result of the reference recording layer testing step and a test result of an another recording layer testing step.

27. The CPU device according to claim 26, the method comprising:
   recording and reproducing the test information with respect to the one recording layer with the gradual variation in recording condition of laser power and the gradual variation in recording condition of pulse-width;
   extracting the irradiation condition suitable for recording information on the one recording layer on the basis of the test result of the reference recording layer testing step;
   recording and reproducing the test information with respect to the another recording layer by the use of the gradual variation in recording condition of the laser power; and
   extracting the irradiation condition of the pulse-width suitable for recording information on the another recording layer on the basis of the test result of the reference recording layer testing step and the test result of the another recording layer testing step.

28. The CPU device according to claim 26, the method comprising:
   recording and reproducing the test information with respect to the one recording layer with the gradual variation in recording condition of laser power and the gradual variation in recording condition of pulse-width using a first number of conditions;
   extracting the irradiation condition suitable for recording information on the one recording layer on the basis of the test result of the reference recording layer testing step;
   recording and reproducing the test information with respect to the another recording layer with either the gradual variation in recording condition of the laser power or the gradual variation in recording condition of the pulse width using a number of conditions smaller than the first number of test recording conditions used in the reference recording layer testing step; and
   extracting the irradiation condition of whichever of the laser power and the pulse-width was not varied suitable for recording information on the another recording layer on the basis of the test result of the reference recording layer testing step and the test result of the another recording layer testing step.

29. The CPU device according to claim 26, the method comprising: a first test information recording step for recording the test information on the one recording layer with the gradual variation in recording condition of laser power and the gradual variation in recording condition of pulse-width; a first information reproducing step for reproducing the test information recorded in the first test information recording step; extracting the irradiation condition suitable for recording information on the one recording layer on the basis of the test result of the reference recording layer testing step; a second test information recording step for recording the test information on the another recording layer with either the gradual variation in recording condition of laser power or the gradual variation in recording condition of pulse-width; a second test information reproducing step for reproducing the test information recorded in the second test information recording step; switching the recording and reproducing of the test information by a number of times, when the recording of the test information in the second test information recording step and the reproducing of the test information in the second test information reproducing step are switched, set smaller than a number of times, when the recording of the test information in the first test information recording step and the reproducing of the test information in the first test information reproducing step are switched; and extracting the irradiation condition of whichever of the laser power and the pulse-width was not varied suitable for recording information on the another recording layer on the basis of the test result of the reference recording layer testing step and the test result of the another recording layer testing step.

30. The CPU device according to claim 26, the method comprising: performing plural times a set of recording and reproducing the test information with respect to the one recording layer, the set comprising a gradual variation in recording condition; extracting the irradiation condition suitable for recording information on the one recording layer on the basis of the test result of the reference recording layer testing step; recording and reproducing the test information with respect to the another recording layer by a number of times smaller than the number of times when the set of recording and reproducing the test information is performed in the reference recording layer testing step; and extracting the irradiation condition suitable for recording information on the another recording layer on the basis of the test result of the reference recording layer testing step and the test result of the another recording layer testing step.

31. The CPU device according to claim 26, the method comprising:
   recording the test information on the one recording layer with a gradual variation in recording condition of a laser power;
   acquiring a variation of a pulse-width-adjusting evaluation indicator comprising at least one of a phase deviation, a length deviation, and an amplitude deviation of a pulse with the variation in recording condition of the laser power when reproducing the test information recorded in the test information recording step;
   acquiring a correlation of the acquired variation of the pulse-width-adjusting evaluation indicator with the variation of the laser power;
   recording the test information on the another recording layer with the gradual variation in recording condition of the laser power;
   calculating a relation of the variation of the pulse-width-adjusting evaluation indicator with the variation of the pulse width in the another recording layer by applying the result of the second test recording step to the correlation; and
   acquiring a pulse-width-adjusting evaluation indicator for determining the pulse width condition in the another recording layer by the use of the relation calculated in the calculation step.

32. The CPU device according to claim 26, the method comprising:
   recording the test information on the one recording layer with a gradual variation in recording condition of a pulse width;
   acquiring a laser-power-adjusting evaluation indicator with the variation in recording condition of the pulse width when reproducing the test information recorded on the one recording layer in the test information recording step;

acquiring a correlation of the variation of the laser-power-adjusting evaluation indicator with the variation of the pulse width;

recording the test information on the another recording layer with the gradual variation in recording condition of the pulse width; and calculating the laser-power-adjusting evaluation indicator with respect to the variation in recording condition of the pulse width in the another recording layer by applying the result of the second test recording step to the correlation.

33. The CPU device according to claim 26, the method comprising:

recording test recording information and/or user data recording information on the recording layers; and reproducing the information recorded in the information recording step and acquiring plural kinds of evaluation indicators of the irradiation conditions of the laser beam from the reproduced information.

34. The optical recording method according to claim 1, comprising:

recording and reproducing the test information with respect to the one recording layer with the gradual variation in recording condition of laser power and the gradual variation in recording condition of pulse-width;

extracting the irradiation condition suitable for recording information on the one recording layer on the basis of the test result of the reference recording layer testing step;

recording and reproducing the test information with respect to the another recording layer by the use of the gradual variation in recording condition of the pulse-width; and extracting the suitable irradiation condition of the laser power suitable for recording information on the another recording layer on the basis of the test result of the reference recording layer testing step and the test result of the another recording layer testing step.

35. The optical recording apparatus according to claim 19, the optical recording apparatus comprises: a reference recording layer testing unit for recording and reproducing the test information with respect to the one recording layer with the gradual variation in recording condition of laser power and the gradual variation in recording condition of pulse-width; a reference-recording-layer irradiation condition extracting unit for extracting the irradiation condition suitable for recording information on the one recording layer on the basis of the test result obtained by the reference recording layer testing unit; an another recording layer testing unit for recording and reproducing the test information with respect to the another recording layer by the use of the gradual variation in recording condition of the pulse-width; and an another-recording-layer irradiation condition extracting unit for extracting the irradiation condition of the laser power suitable for recording information on the another recording layer on the basis of the test result obtained by the reference recording layer testing unit and the test result obtained by the another recording layer testing unit.

36. The CPU device according to claim 26, the method comprising:

recording and reproducing the test information with respect to the one recording layer with the gradual variation in recording condition of laser power and the gradual variation in recording condition of pulse-width;

extracting the irradiation condition suitable for recording information on the one recording layer on the basis of the test result of the reference recording layer testing step;

recording and reproducing the test information with respect to the another recording layer by the use of the gradual variation in recording condition of the pulse-width; and extracting the irradiation condition of the laser power suitable for recording information on the another recording layer on the basis of the test result of the reference recording layer testing step and the test result of the another recording layer testing step.

* * * * *